(12) United States Patent
Kauppi

(10) Patent No.: US 12,545,599 B2
(45) Date of Patent: Feb. 10, 2026

(54) METHOD AND SYSTEM FOR TREATING FLUID AND FLOTATION ARRANGEMENT

(71) Applicant: Metso Finland Oy, Espoo (FI)

(72) Inventor: Janne Kauppi, Taipalsaari (FI)

(73) Assignee: Metso Finland Oy, Espoo (FI)

( * ) Notice: Subject to any disclaimer, the term of this patent is extended or adjusted under 35 U.S.C. 154(b) by 854 days.

(21) Appl. No.: 17/789,619

(22) PCT Filed: Dec. 31, 2019

(86) PCT No.: PCT/FI2019/050935
§ 371 (c)(1),
(2) Date: Jun. 28, 2022

(87) PCT Pub. No.: WO2021/136870
PCT Pub. Date: Jul. 8, 2021

(65) Prior Publication Data
US 2023/0049273 A1    Feb. 16, 2023

(51) Int. Cl.
*C02F 1/24* (2023.01)
*B03D 1/02* (2006.01)
(Continued)

(52) U.S. Cl.
CPC ............... *C02F 1/24* (2013.01); *B03D 1/028* (2013.01); *B03D 1/1406* (2013.01); *C02F 1/008* (2013.01);
(Continued)

(58) Field of Classification Search
None
See application file for complete search history.

(56) References Cited

U.S. PATENT DOCUMENTS 3,929,582 A    12/1975 Kellner
3,969,245 A *   7/1976 Ramirez ............ B01D 17/047
                                              210/221.1

(Continued)

FOREIGN PATENT DOCUMENTS

EP    0596210 A1    5/1994
EP    1270077 A1    1/2003
(Continued)

OTHER PUBLICATIONS

Extended European Search Report for European Patent Application No. 19958707.2, mailed Aug. 7, 2023.
(Continued)

*Primary Examiner* — Richard C Gurtowski
(74) *Attorney, Agent, or Firm* — Andrus Intellectual Property Law, LLP

(57) ABSTRACT

A method and a system for treating fluid. The method includes a fluid feeding step for feeding fluid in a fluid feeding pipe into a fluid reactor vessel, a bubbles feeding step for feeding bubbles of first fluid mixture containing first carrier fluid and first active fluid into fluid flowing in the fluid feeding pipe by means of a sparger apparatus. The method incudes a fluid mixture analyzing step for measuring the relative content of first active fluid in the first fluid mixture with a first fluid analyzer and controlling a first active fluid source with the first fluid analyzer in response to the relative content of first active fluid in the first fluid mixture as measured by the first fluid analyzer.

46 Claims, 11 Drawing Sheets

Figure 1:
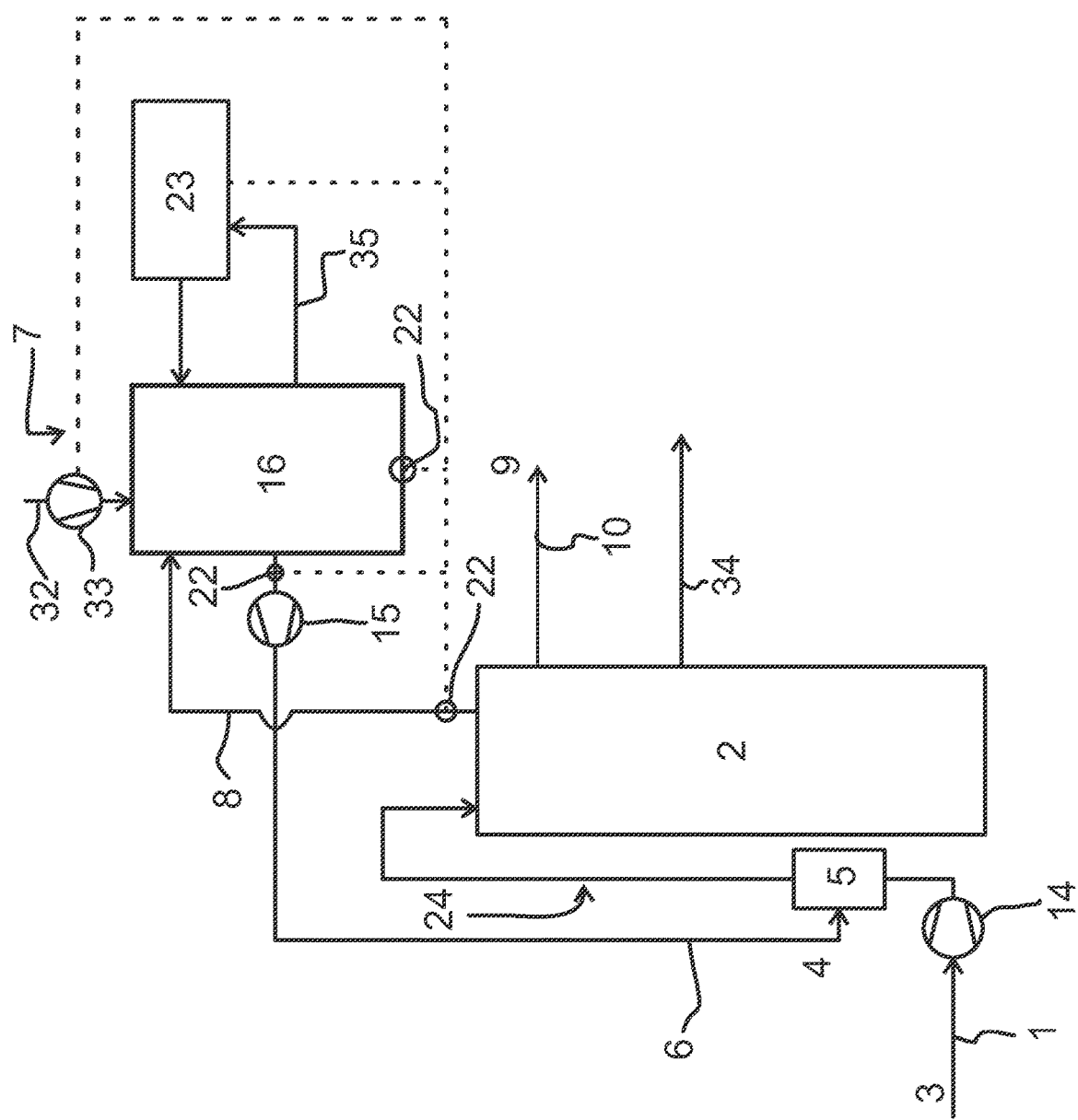

(51) Int. Cl.
- B03D 1/14 (2006.01)
- C02F 1/00 (2023.01)
- C02F 1/32 (2023.01)
- C02F 1/70 (2023.01)
- C02F 1/72 (2023.01)
- *C02F 103/10* (2006.01)

(52) U.S. Cl.
CPC .................. C02F 1/32 (2013.01); C02F 1/70 (2013.01); C02F 1/725 (2013.01); *C02F 2103/10* (2013.01); *C02F 2209/38* (2013.01); *C02F 2305/08* (2013.01)

(56) References Cited

U.S. PATENT DOCUMENTS

| | | | | |
|---|---|---|---|---|
| 4,752,401 A | * | 6/1988 | Bodenstein | C02F 1/4606 210/764 |
| 4,900,535 A | * | 2/1990 | Goodes | C01B 7/191 423/166 |
| 5,653,945 A | | 8/1997 | Gathje et al. | |
| 2005/0139530 A1 | * | 6/2005 | Heiss | C02F 9/00 210/257.2 |
| 2008/0142452 A1 | | 6/2008 | Denkewicz et al. | |

FOREIGN PATENT DOCUMENTS

| | | | |
|---|---|---|---|
| JP | 2001046809 A | 2/2001 | |
| WO | 9841315 A1 | 9/1998 | |
| WO | WO-2005110606 A1 * | 11/2005 | ............ B03D 1/028 |
| WO | 2013184561 A1 | 12/2013 | |

OTHER PUBLICATIONS

Supplementary European Search Report for European Patent Application No. 19958707.2, mailed Aug. 7, 2023.

International Search Report and Written Opinion for PCT Application No. PCT/FI2019/050935, mailed Apr. 29, 2020.

* cited by examiner

METHOD AND SYSTEM FOR TREATING FLUID AND FLOTATION ARRANGEMENT

CROSS-REFERENCE TO RELATED APPLICATIONS

This application is the U.S. national stage application of International Application PCT/FI2019/050935, filed Dec. 31, 2019, which international application was published on Jul. 8, 2021, as International Publication WO 2021/136870 A1 in the English language.

FIELD

The invention relates to a method for treating fluid as defined in the preamble of independent claim 1.

The invention also relates to a system for treating fluid as defined in the preamble of independent claim 21.

The invention relates also to a flotation arrangement as defined in claim 43.

OBJECT

The object is to provide a method and a system for changing the physical and/or the chemical characteristics of elements such as of impurities in a fluid.

SHORT DESCRIPTION

The method is characterized by the definitions of independent claim 1.

Preferred embodiments of the method are defined in the dependent claims 2 to 20.

The system is correspondingly characterized by the definitions of independent claim 21.

Preferred embodiments of the system are defined in the dependent claims 22 to 42.

The invention relates also to a flotation arrangement as defined in claim 43.

Preferred embodiments of the flotation arrangement are defined in dependent claims 44 to 46.

The invention is based on changing the physical and/or the chemical characteristics, typically by adjusting the oxidation state, of impurities in a fluid to be treated by feeding a first fluid mixture in the form of bubbles into the fluid to be treated by means of a sparger apparatus prior feeding the fluid into a fluid reactor vessel. The changing of the characteristics, for example adjusting of the oxidation state, is made by controlling the relative content of first active fluid in the first fluid mixture. By controlling the content of active fluid and selecting a suitable active fluid, for example in order to adjust the oxidation state of elements contained in the fluid to be treated, the elements such as impurities in the fluid will be attracted to and attach to the bubbles of first fluid mixture in the fluid and/or elements such as impurities in the fluid to be treated will react with the active fluid of the bubbles of the first fluid mixture. The reaction and/or the attraction/attaching will occur in a first reaction pipe section of the fluid feed pipe that is downstream of the sparger apparatus and upstream of the fluid reactor vessel and/or in the fluid reactor vessel. In the fluid reactor vessel, bubbles of first fluid mixture will raise to the surface of the fluid possible carrying elements contained in the fluid to be treated and to be removed from the fluid. As mentioned, it is typical that the active fluid of the bubbles of first fluid mixture react with elements contained in the fluid to be treated so that the physical and/or chemical characteristics of said element changes. The reaction can for example be an oxidizing or a reducing reaction. First fluid mixture will raise from the fluid surface in the fluid reactor vessel and will be recirculated back to a first fluid source for first fluid mixture and will from there be recirculated back to the sparger apparatus. The attraction and the attaching of components contained in the fluid to the bubbles of first fluid mixture and/or the reaction of first fluid mixture with fluid will however consume the relative content of first active fluid in the first fluid mixture. To ensure that the relative content of first active fluid in the first fluid mixture is correct i.e. is within a predetermined range in the first fluid mixture, a first fluid analyzer is provided for measuring and determining the relative content of first active fluid in the first fluid mixture. This first fluid analyzer is functionally connected with at least one first active fluid source for first active fluid and is configured to control said at least one first active fluid source for first active fluid in response to the measured relative content of first active fluid in the first fluid mixture and consequently configured to add first active fluid to the first fluid mixture if the first fluid mixture contains too little first active fluid. This can for example be made by opening a valve between the first fluid source for first fluid mixture and said at least one first active fluid source for first active fluid. In other words, by controlling the relative content of first active fluid in the first fluid mixture, for example the oxidation state or the reduction state of the first fluid mixture will be controlled and/or the attraction and the adhering effect of the first fluid mixture that is fed into the fluid in the form of bubbles of first fluid mixture will be maintained.

LIST OF FIGURES

Figure 2:
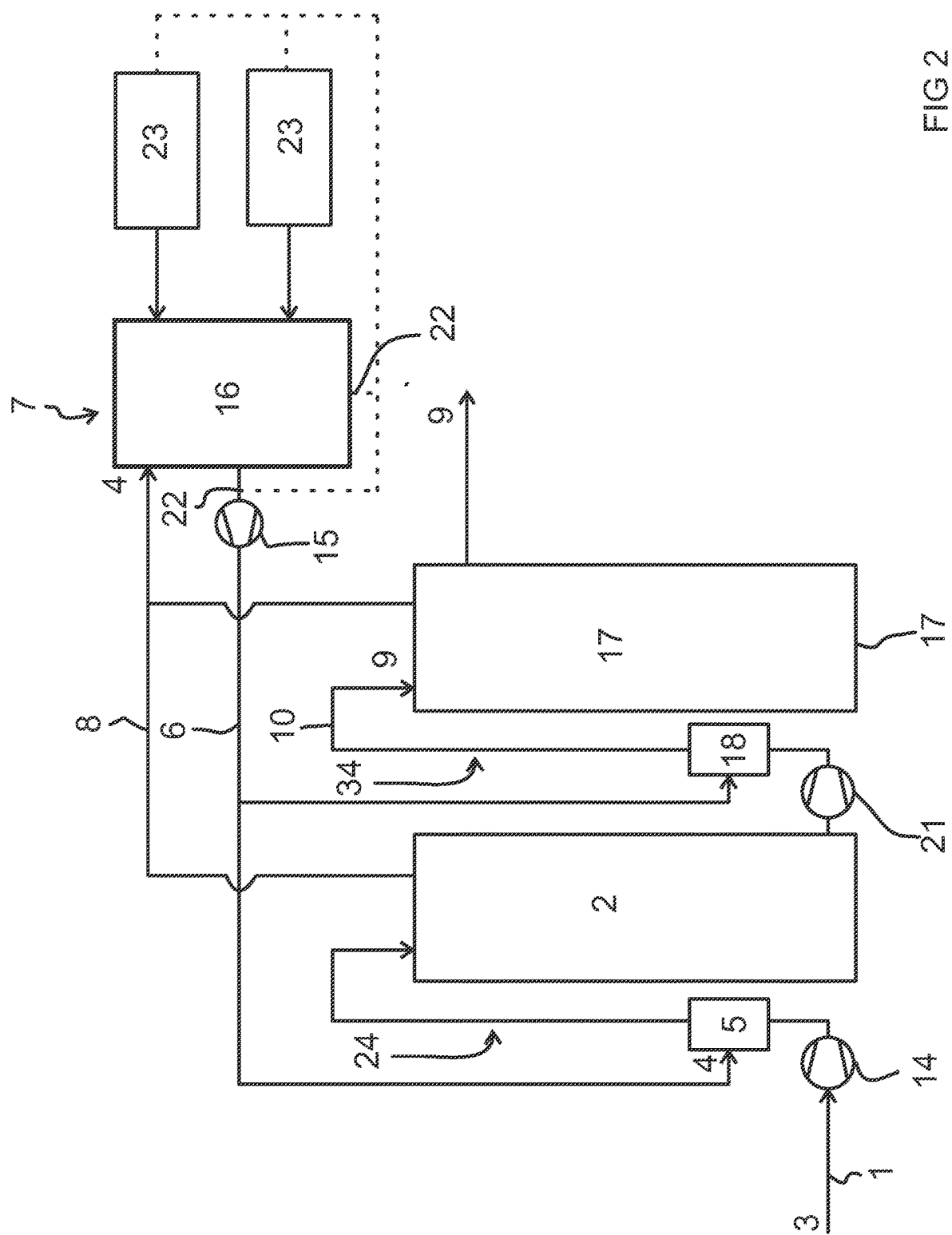

In the following the invention will described in more detail by referring to the figures, which FIG. 1 shows a flow sheet of a first embodiment of the method and the system, FIG. 2 shows a flow sheet of a second embodiment of the method and the system.

Figure 3:
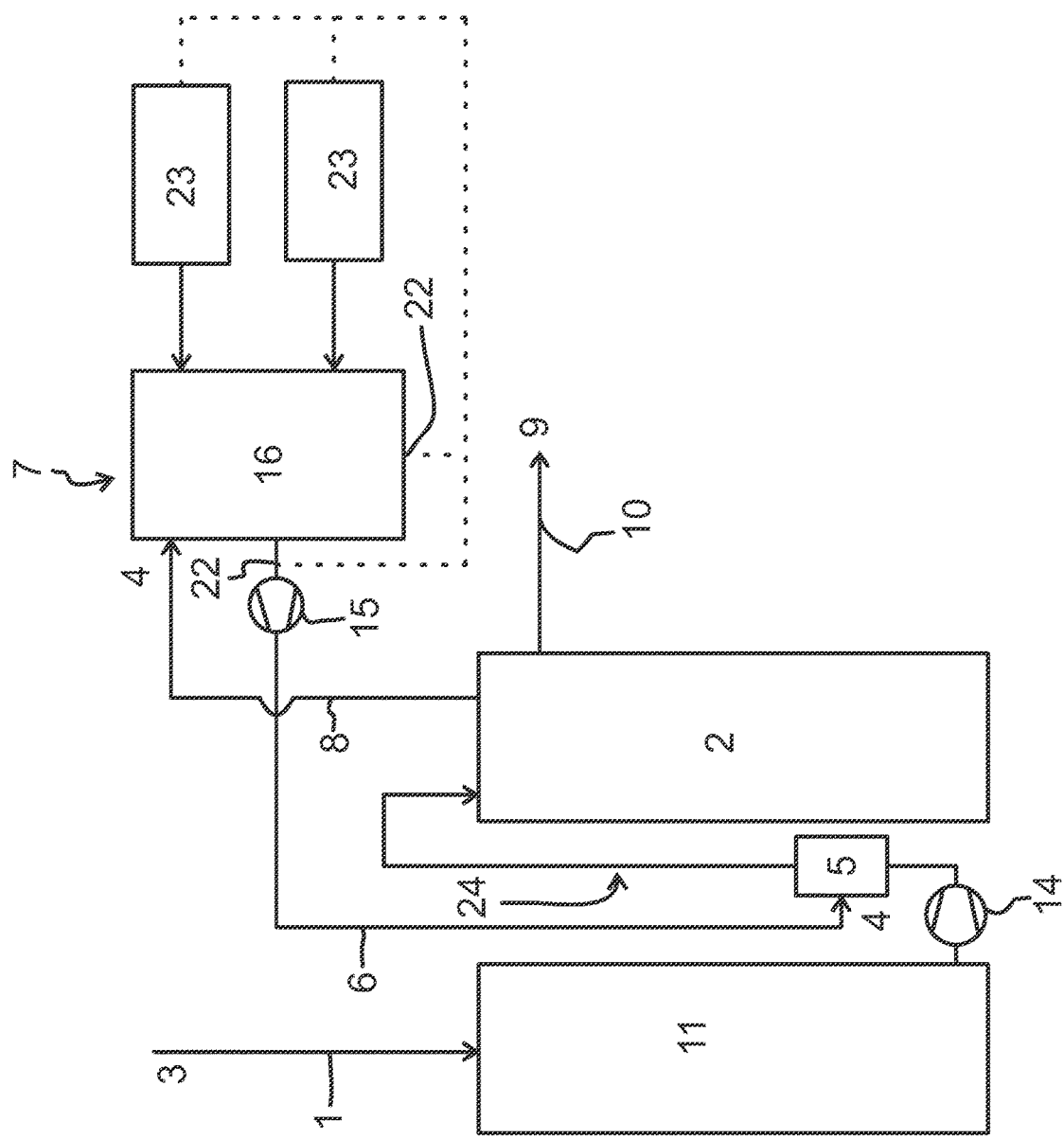
Figure 4:
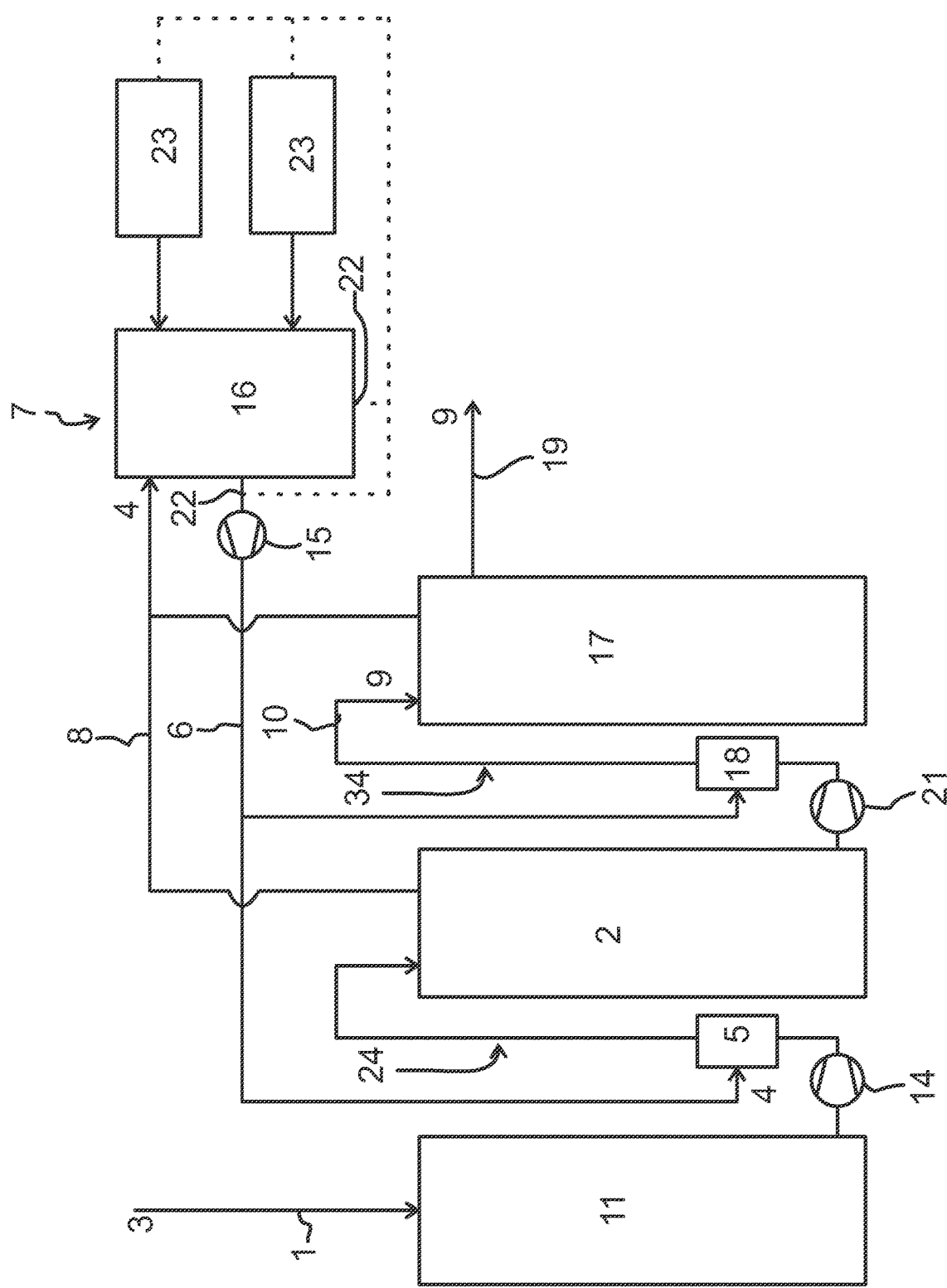
Figure 5:
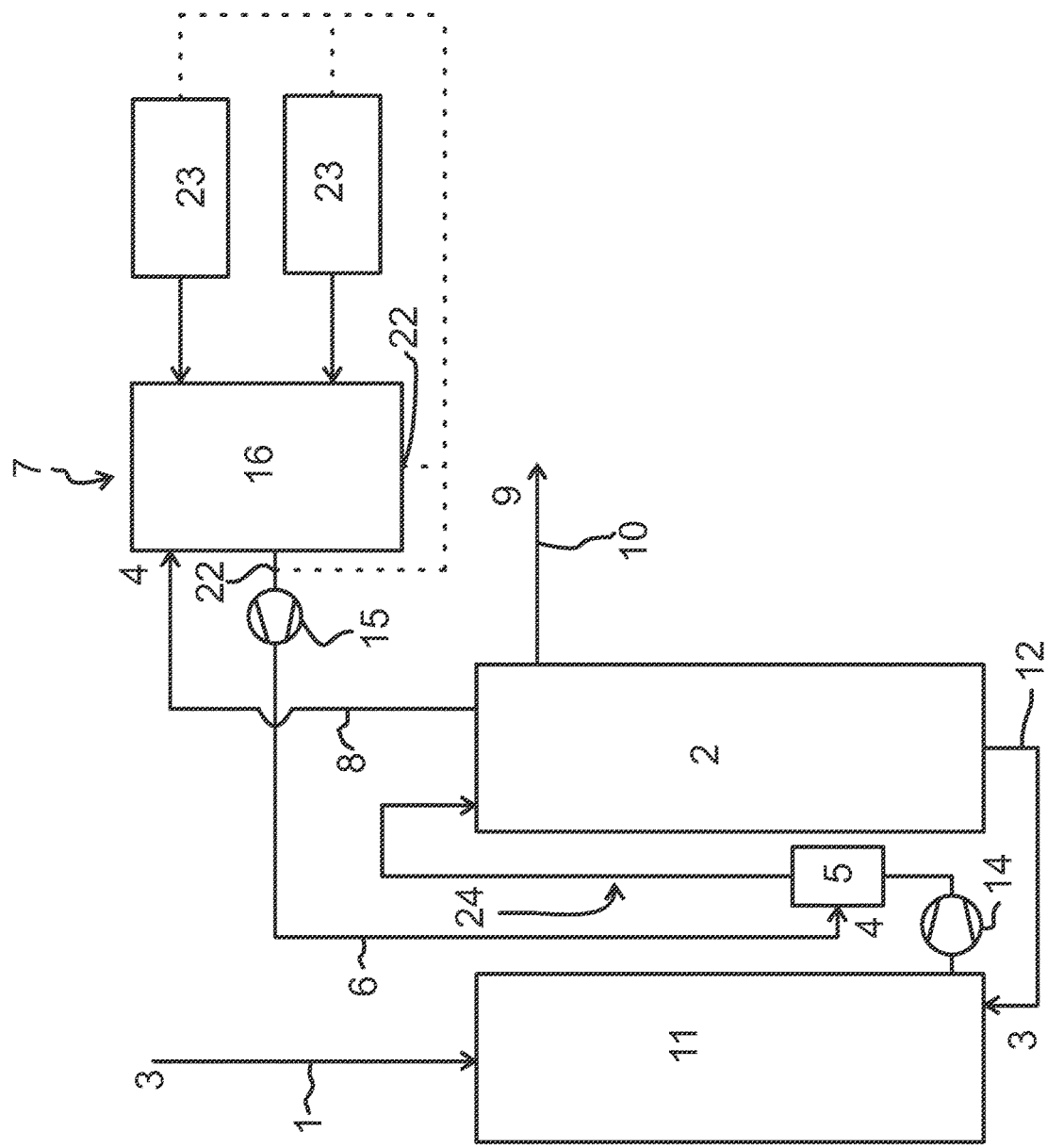
Figure 6:
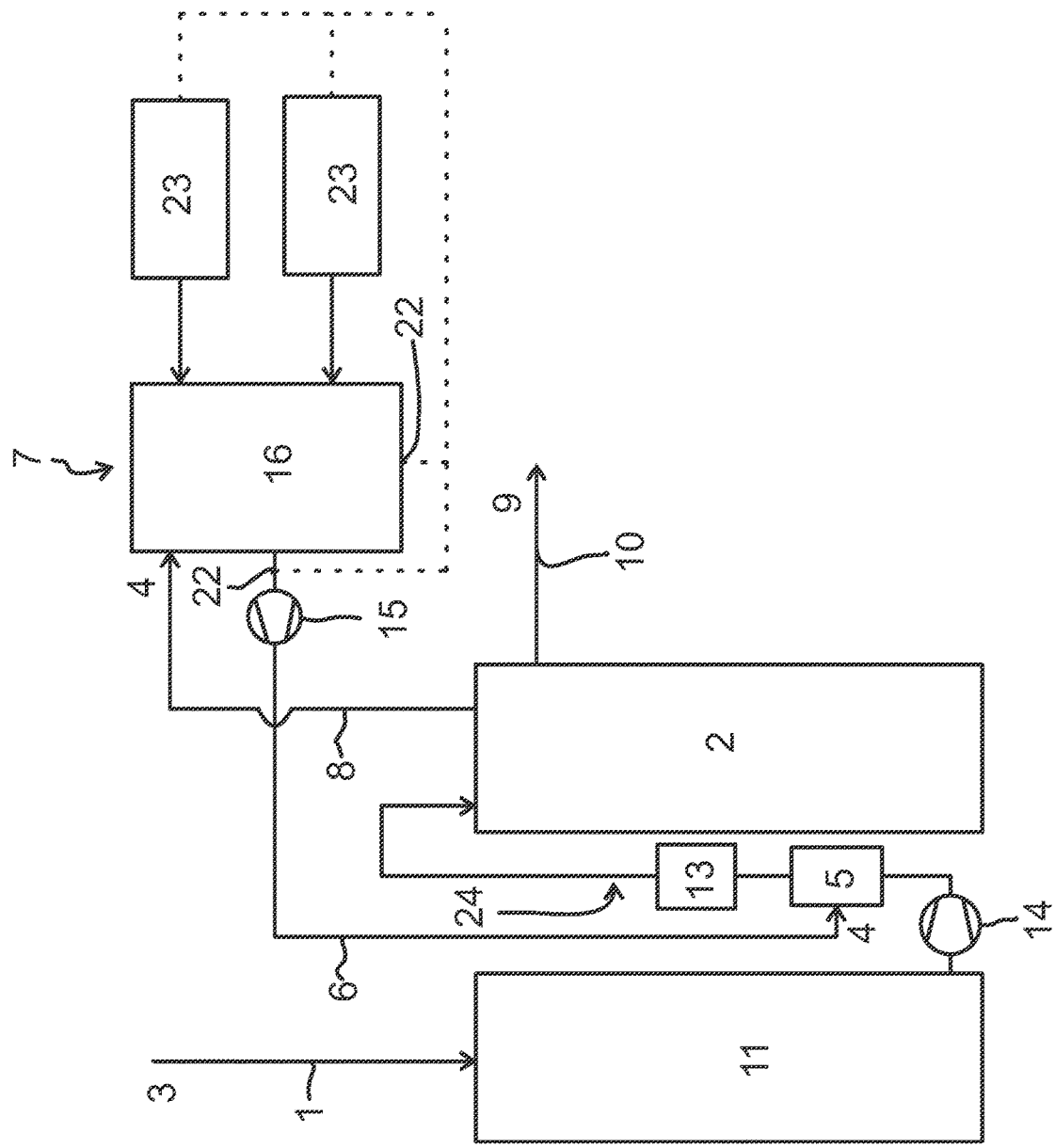
Figure 7:
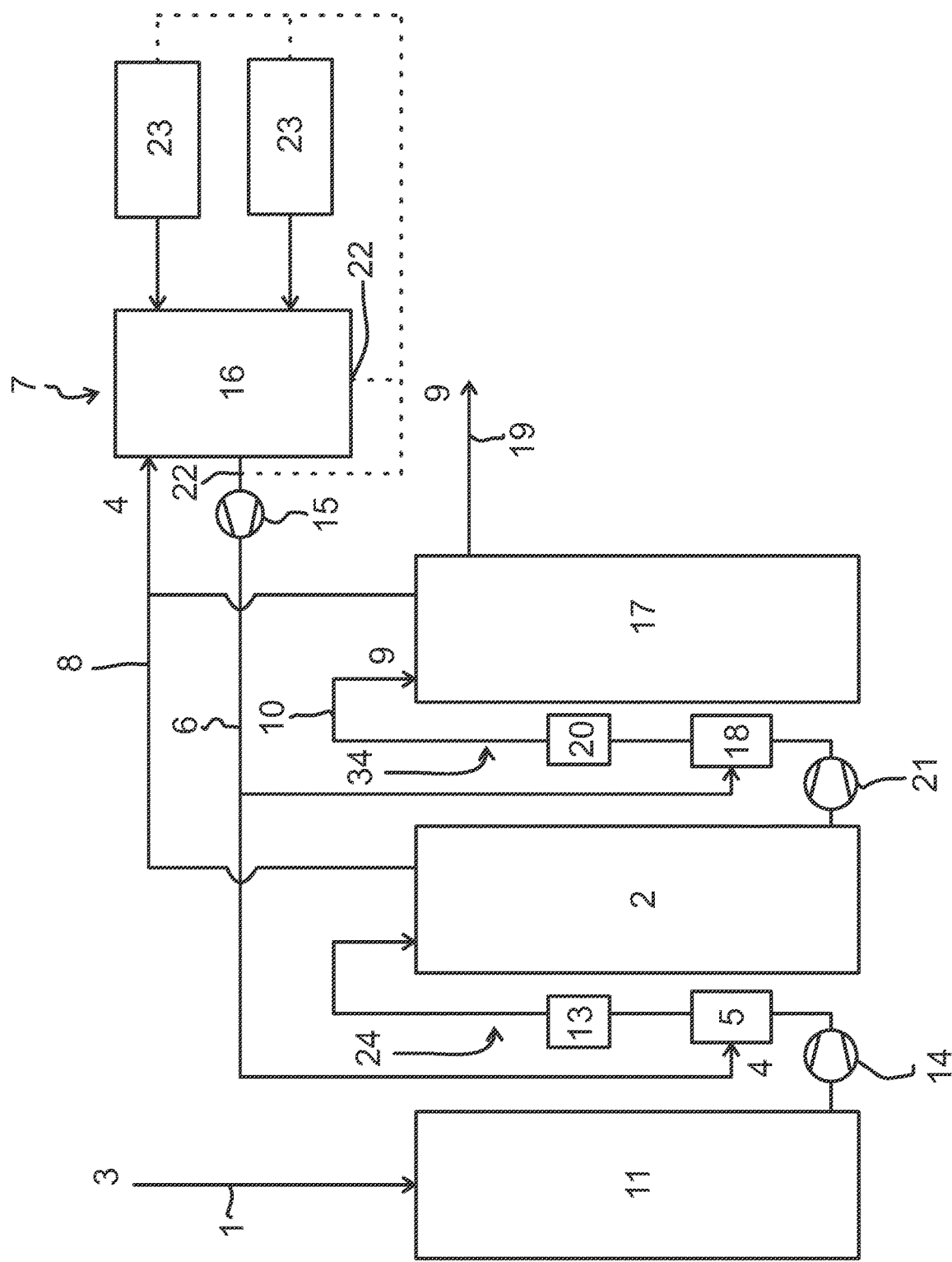
Figure 8:
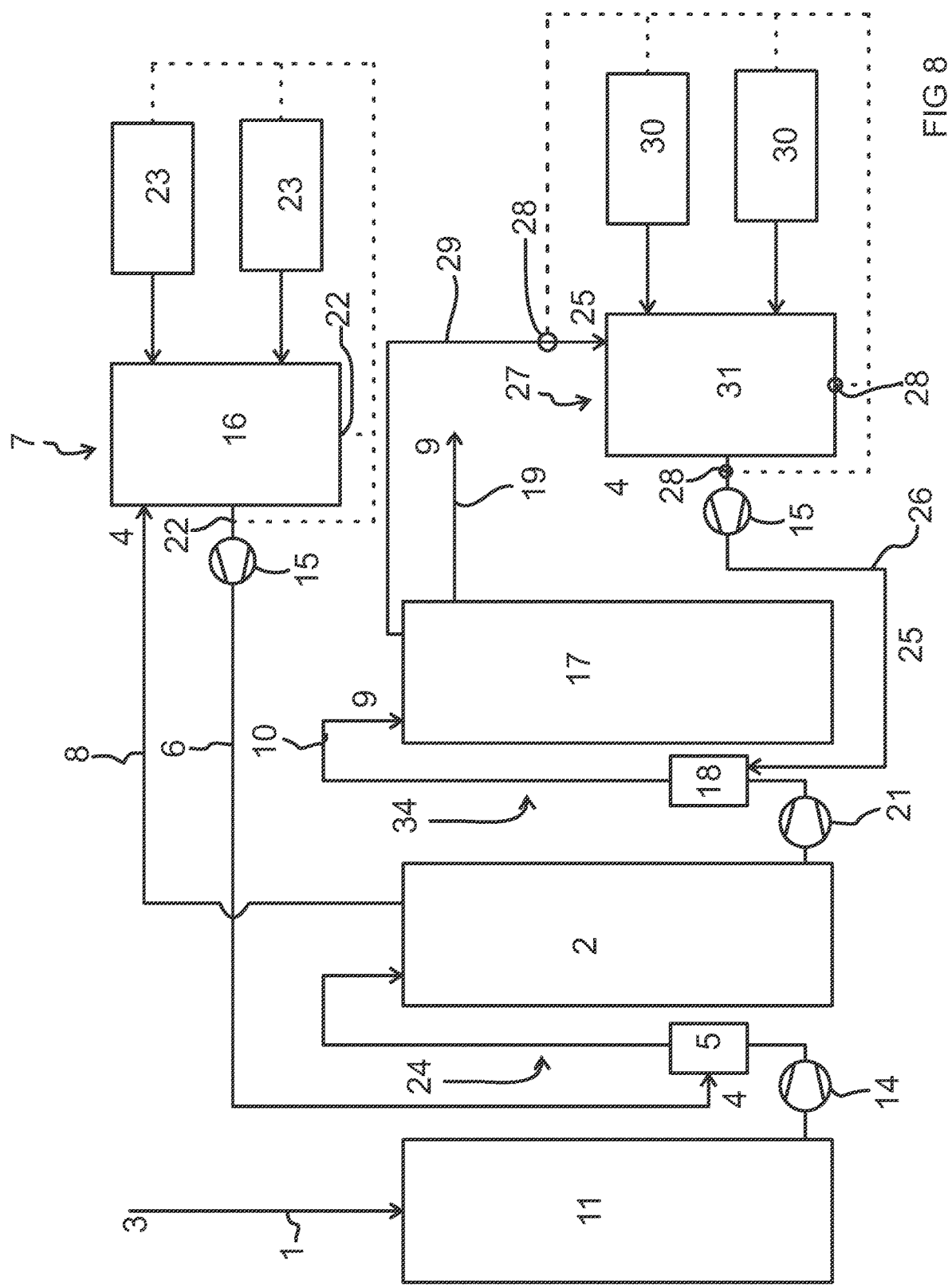
Figure 9:
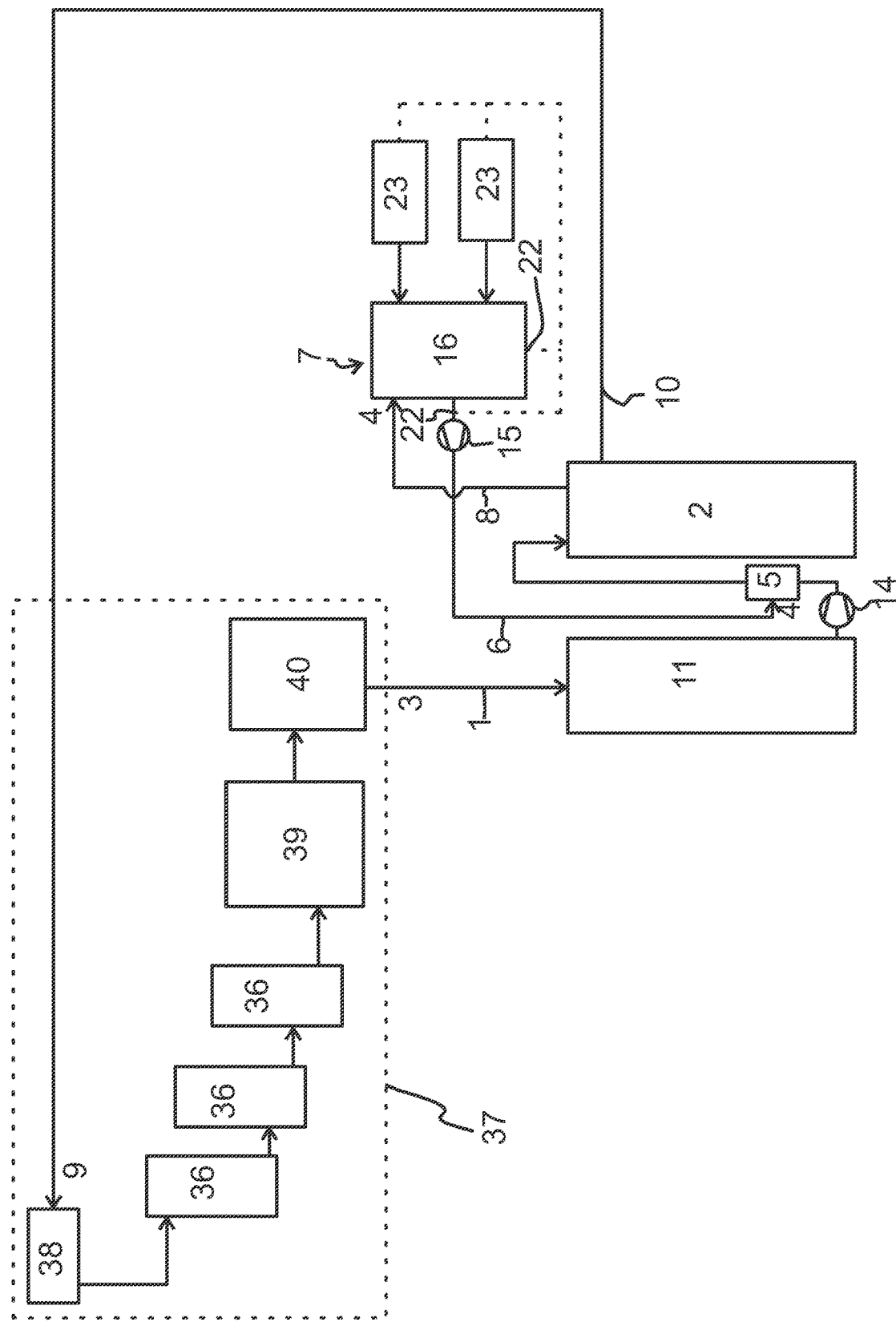
Figure 10:
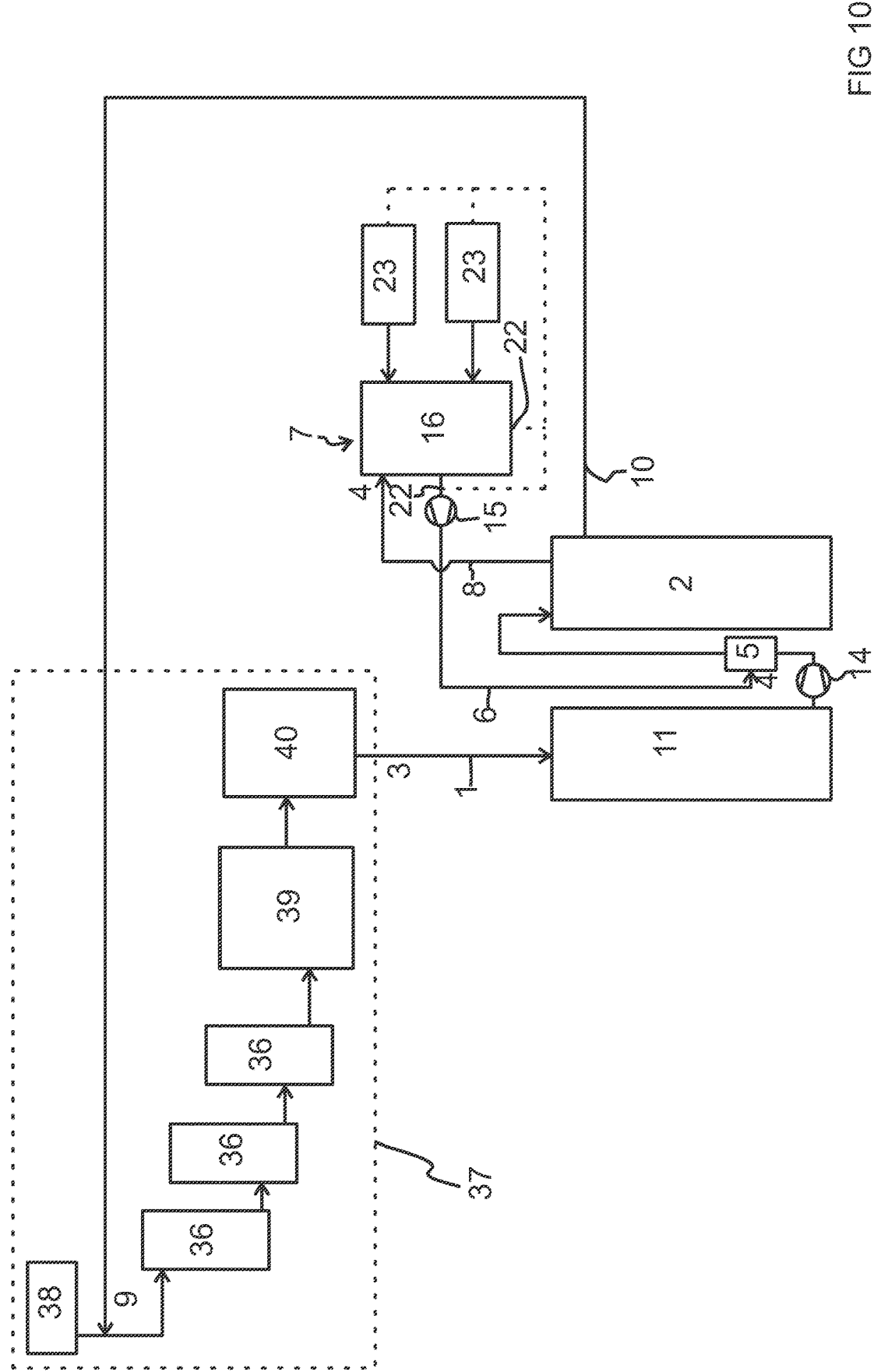
Figure 11:
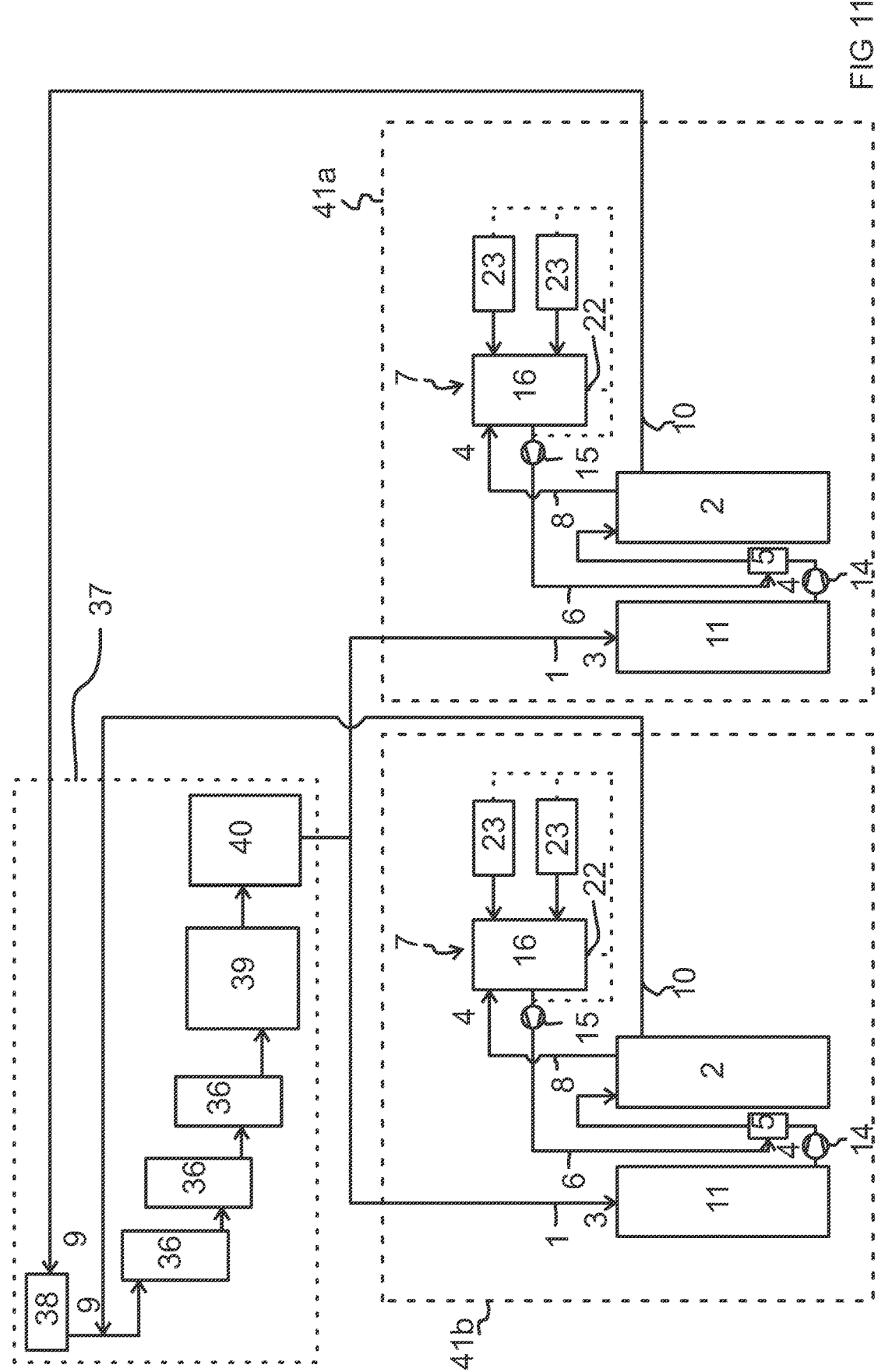

FIG. 3 shows a flow sheet of a third embodiment of the method and the system, FIG. 4 shows a flow sheet of a fourth embodiment of the method and the system, FIG. 5 shows a flow sheet of a fifth embodiment of the method and the system, FIG. 6 shows a flow sheet of a sixth embodiment of the method and the system, FIG. 7 shows a flow sheet of a seventh embodiment of the method and the system, FIG. 8 shows a flow sheet of an eight embodiment of the method and the system, FIG. 9 shows a flow sheet of a ninth embodiment of the method and the system, FIG. 10 shows a flow sheet of a tenth embodiment of the method and the system, and FIG. 11 shows a flow sheet of an embodiment of the flotation arrangement.

DETAILED DESCRIPTION OF THE INVENTION

First the method for treating fluid 3 and same preferred embodiments and variants of the method will be described in greater detail.

The method comprises a fluid feeding step for feeding fluid 3 such as liquid or suspension in a fluid feeding pipe 1 into a fluid reactor vessel 2 that is preferably, but not necessarily, a liquid-gas reactor vessel.

The method comprises a bubbles feeding step for feeding bubbles of first fluid mixture 4 containing first carrier fluid and first active fluid into fluid 3 flowing in the fluid feeding pipe 1 by means of a sparger apparatus 5 that is in fluid connection with the fluid feeding pipe 1. The first fluid mixture 4 is preferably, but not necessarily, gas mixture. The first carrier fluid is preferably, but not necessarily, carrier gas. The first active fluid is preferably, but not necessarily, active gas.

The method comprises a fluid mixture feeding step for feeding first fluid mixture 4 to the sparger apparatus 5 in a first fluid mixture feeding pipe 6 from a first fluid source 7 for first fluid mixture 4. The first fluid mixture feeding pipe 6 is in fluid connection with the first fluid source 7 for first fluid mixture 4 and in fluid connection with the sparger apparatus 5. Components of the fluid 3 is configured to be attracted to and attach to bubbles of first fluid mixture 4 and/or first fluid mixture 4 is configured to react with said fluid 3 in a reaction step in at least one of a first reaction pipe section 24 of the fluid feeding pipe 1, which first reaction pipe section 24 of the fluid feeding pipe 1 is downstream of the sparger apparatus 5 and upstream of the fluid reactor vessel 2, and the fluid reactor vessel 2.

The method comprises a fluid mixture recirculation step for discharging first fluid mixture 4 from the fluid reactor vessel 2 and for feeding first fluid mixture 4 to the first fluid source 7 for first fluid mixture 4 in a first fluid mixture return pipe 8 that is in fluid connection with the fluid reactor vessel 2 and that is in fluid connection with the first fluid source 7 for first fluid mixture 4.

The method comprises a fluid mixture analyzing step for measuring the relative content of first active fluid in the first fluid mixture 4 with a first fluid analyzer 22 that can for example be arranged in one of the first fluid mixture feeding pipe 6, the first fluid source 7 for first fluid mixture 4, and the first fluid mixture return pipe 8.

The method comprises functionally connecting at least one first active fluid source 23 for first active fluid in fluid connection with the first fluid source 7 for first fluid mixture 4.

The method comprises functionally connecting the first fluid analyzer 22 and said at least one first active fluid source 23 for first active fluid.

The method comprises controlling said at least one first active fluid source 23 with the first fluid analyzer 22 in response to the relative content of first active fluid in the first fluid mixture 4 as measured by the first fluid analyzer 22.

The method comprises fluid discharging step for discharging treated fluid 9 from the fluid reactor vessel 2 by means of a fluid discharge pipe 10 that is in fluid connection with the fluid reactor vessel 2.

The method can comprise functionally connecting the first fluid analyzer 22 with a pump means 33 configured to add first carrier fluid in the form of air into the first fluid mixture 4 via an air inlet 32 from the ambient air as illustrated in FIG. 1 and controlling the pump means 33 with the fluid analyzer 22 in response to the relative content of first active fluid in the first fluid mixture 4 as measured by the first fluid analyzer 22.

The method can, as illustrated in FIG. 1, comprise feeding first fluid mixture 4 from the first fluid source 7 for first fluid mixture 4 to the first active fluid source 23 for first active fluid in an active fluid component return pipe 35.

The fluid feeding step of the method comprises preferably, but not necessarily, as illustrated in the embodiments shown in FIGS. 3 to 10, feeding fluid 3 into the fluid reactor vessel 2 in the fluid feeding pipe 1 via a fluid storage tank 11 provided in the fluid 6 feeding pipe 1 upstream of the sparger apparatus 5. A purpose of such fluid storage tank 1 is to make the flow of fluid 3 in the fluid feeding pipe 1 even before the sparger apparatus 5 by providing an intermediate storage or buffer for fluid.

If the fluid feeding step of the method comprises feeding fluid 3 into the fluid reactor vessel 2 in the fluid feeding pipe 1 via a fluid storage tank 11 provided in the fluid feeding pipe 1 upstream of the sparger apparatus 5, the method can, as illustrated in FIG. 5, comprise a fluid return step for feeding fluid 3 from the fluid reactor vessel 2 in a fluid return pipe 12 to the fluid storage tank 11.

The fluid feeding step of the method can, as illustrated in FIGS. 7 and 8, comprise subjecting fluid 3 flowing in the fluid feeding pipe 1 to UV-radiation by means of an UV-source 13 provided downstream of the sparger apparatus 5 in the fluid feeding pipe 1. A purpose of such UV can be to make ionized fluid of components in the first fluid mixture 4 and so to enhance and to promote adhering of components such as impurities contained in the fluid 3 to the bubbles of first fluid mixture 4 provided in the fluid 3 by means of the sparger apparatus 6. Another purpose of such UV can be to produce radicals in the first fluid mixture 4 and this promotes the oxidizing or reduction effect and/or to eliminate possible micro-organisms and microbes. Because the fluid 3 contains bubbles of first fluid mixture 4, more preferably gas bubbles of first fluid mixture 4, the effect of the UV radiation is more effective than if the bubbles were not present, because the bubbles of first fluid mixture 4 enables for a deeper penetration of the UV-radiation into the fluid 3.

The fluid feeding step of the method comprises preferably, but not necessarily, creating a flow of fluid 3 in the fluid feeding pipe 1 by means of a fluid pump means 14 provided in the fluid feeding pipe 1, as illustrated in the embodiments shown in FIGS. 1 to 10.

The fluid mixture feeding step of the method comprises preferably, but not necessarily, creating a flow of first fluid mixture 4 in the first fluid mixture feeding pipe 6 by means of a fluid mixture pumping means 15 such as a fan provided in the first fluid mixture feeding pipe 6, as illustrated in the embodiments shown in FIGS. 1 to 10.

The fluid mixture feeding step of the method comprises preferably, but not necessarily, feeding first fluid mixture 4 to the sparger apparatus 5 via a fluid mixture tank 16 that is configured to contain first fluid mixture 4 and that is in fluid connection with the first fluid mixture feeding pipe 6, as illustrated in the embodiments shown in FIGS. 1 to 10. A purpose of such fluid mixture tank 16 is to make the flow of first fluid mixture 4 in the first fluid mixture feeding pipe 6 even before the sparger apparatus 5 by providing an intermediate storage or buffer for first fluid mixture 4.

The bubbles feeding step for feeding bubbles of first fluid mixture 4 into fluid 3 flowing in the fluid feeding pipe 1 by means of the sparger apparatus 5 comprises preferably, but not necessarily, feeding bubbles of first fluid mixture 4 having a size between 0 and 100 µm or between 1 and 100 µm, preferably so that 90% of the bubbles of first fluid mixture 4 having a size between 30 and 100 µm, and more preferably so that 90% of the bubbles of first fluid mixture 4 having a size between 30 and 100 µm and so that the 50% of the bubbles of first fluid mixture 4 is within a range of 30 µm.

The method can, as in the second embodiment of the method illustrated in FIG. 2, in the fourth embodiment illustrated in FIG. 4, and in the seventh embodiment illustrated in FIG. 7, comprise feeding treated fluid 9 in the fluid discharging step in the fluid discharge pipe 10 to an additional fluid reactor vessel 17, which preferably, but not necessarily, is a liquid-gas reactor vessel. In such embodiments, the bubbles feeding step comprise additionally feeding bubbles of first fluid mixture 4 into treated fluid 9 flowing in the fluid discharge pipe 10 by means of an additional sparger apparatus 18 that is in fluid connection with the fluid discharge pipe 10. In such embodiments, the fluid mixture feeding step comprises additionally feeding first fluid mixture 4 to the additional sparger apparatus 18 in the first fluid mixture feeding pipe 6 from the first fluid source 7 for first fluid mixture 4 that is additionally arranged in fluid connection with the first fluid source 7 for first fluid mixture 4 and in fluid connection with the additional sparger apparatus 18 with the first fluid mixture feeding pipe 6. In such embodiments of the method, the fluid mixture discharging step comprise additionally discharging first fluid mixture 4 from the additional fluid reactor vessel 17 and for feeding first fluid mixture 4 to the first fluid source 7 for first fluid mixture 4 in the first fluid mixture return pipe 8 that is additionally arranged in fluid connection with the additional fluid reactor vessel 17. In these embodiments of the method, components of the fluid 3 is configured to be attracted to and attach to the bubbles of first fluid mixture 4 and/or first active fluid of the first fluid mixture 4 is configured to react with said treated fluid 9 in a reaction step in at least one of a second reaction pipe section 34 of the fluid discharge pipe 10, which second reaction pipe section 34 of the fluid discharge pipe 10 is downstream of the additional sparger apparatus 18 and upstream of the additional fluid reactor vessel 17, and the additional fluid reactor vessel 17. In such embodiments of the method, the fluid discharging step comprise additionally discharging treated fluid 9 from the additional fluid reactor vessel 17 by means of an additional fluid discharge pipe 19 that is in fluid connection with the additional fluid reactor vessel 17. In such embodiments of the method, the fluid feeding step comprises preferably, but not necessarily, as illustrated in the embodiment shown in FIG. 7, additionally subjecting treated fluid 9 flowing in the fluid discharge pipe 10 to UV-radiation by means of an additional UV-source 20 provided downstream of the additional sparger apparatus 18 in the fluid discharge pipe 10. A purpose of such UV is to make ionized fluid of components in the first fluid mixture 4 and so to enhance and promote adhering of impurities contained in the treated fluid 9 to the bubbles of first fluid mixture 4 provided in the treated fluid 9 by means of the additional sparger apparatus 18. In such embodiments of the method, the fluid feeding step comprises, preferably, but not necessarily, additionally creating a flow of treated fluid 9 in the fluid discharge pipe 10 by means of an additional fluid pump means 21 provided in the fluid discharge pipe 10 as illustrated in FIGS. 2, 4, and 7. The bubbles feeding step for feeding bubbles of first fluid mixture 4 into treated fluid 9 flowing in the fluid discharge pipe 10 by means of the additional sparger apparatus 18 comprises in such embodiment of the method preferably, but not necessarily, feeding bubbles of first fluid mixture 4 having a size between 0 and 100 μm or between 1 and 100 μm, preferably so that 90% of the bubbles of first fluid mixture 4 having a size between 30 and 100 μm, and more preferably so that 90% of the bubbles of first fluid mixture 4 having a size between 30 and 100 μm and so that the 50% of the bubbles of first fluid mixture 4 is within a range of 30 μm.

The method can, as in the eight embodiment of the method illustrated in FIG. 8, comprise feeding treated fluid 9 in the fluid discharging step in the fluid discharge pipe 10 to an additional fluid reactor vessel 17, which preferably, but not necessarily, is a liquid-gas reactor vessel. The bubbles feeding step comprise in this eight embodiment of the method additionally feeding bubbles of a second fluid mixture 25 containing second carrier fluid and second active fluid into treated fluid 9 flowing in the fluid discharge pipe 10 by means of an additional sparger apparatus 18 that is in fluid connection with the fluid discharge pipe 10. The second fluid mixture 25 has preferably, but not necessarily, a different composition than the first fluid mixture 4. The fluid mixture feeding step comprises in this eight embodiment additionally feeding second fluid mixture 25 to the additional sparger apparatus 18 in a second fluid mixture feeding pipe 26 from a second fluid source 27 for second fluid mixture 25 that is in fluid connection with the second fluid source 27 for second fluid mixture 25 and that is in fluid connection with the additional sparger apparatus 18 with the second fluid mixture feeding pipe 26. In this eight embodiment of the method, components of the treated fluid 9 is configured to be attracted to and attach to bubbles of second fluid mixture 25 and/or to react with said treated fluid 9 in an additional reaction step in at least one of a second reaction pipe section 34 of the fluid discharge pipe 10, which second reaction pipe section 34 of the fluid discharge pipe 10 is downstream of the additional sparger apparatus 18 and upstream of the additional fluid reactor vessel 17, and the additional fluid reactor vessel 17. The fluid mixture discharging step comprise in this eight embodiment additionally discharging second fluid mixture 25 from the additional fluid reactor vessel 17 and feeding second fluid mixture 25 to the second fluid source 27 for second fluid mixture 25 in a second fluid mixture return pipe 29 that is in fluid connection with the additional fluid reactor vessel 17 and that is in fluid connection with the second fluid source 27 for second fluid mixture 25. This eight embodiment comprises a second fluid mixture analyzing step for measuring the relative content of second active fluid in the second fluid mixture 25 with a second fluid analyzer 28 that can for example be arranged in one of the second fluid mixture feeding pipe 26, the second fluid mixture return pipe 29, and the second fluid source 27 for second fluid mixture 25. This eight embodiment comprises functionally connecting at least one second active fluid source 30 in fluid connection with the second fluid source 27 for second fluid mixture 25. This eight embodiment comprises functionally connecting the second fluid analyzer 28 and the second active fluid source 30, and controlling said at least one second active fluid source 30 with the second fluid analyzer 28 in response to the relative content of second active fluid in the second fluid mixture 25 as measured by the second fluid analyzer 28. The fluid discharging step of this eight embodiment comprise additionally discharging treated fluid 9 from the additional fluid reactor vessel 17 by means of an additional fluid discharge pipe 19 that is in fluid connection with the additional fluid reactor vessel 17. The second fluid mixture 25 is preferably, but not necessarily, gas mixture. The second carrier fluid in the second fluid mixture 25 is preferably, but not necessarily, carrier gas. The second active fluid in the second fluid mixture 25 is preferably, but not necessarily, active gas component. The second active fluid in the second fluid mixture 25 is preferably, but not necessarily, at least one of oxygen, hydrogen peroxide, ozone, chlorine, a hypochlorite, a peroxide, a permanganate, a persulfate, a ferrate, peracetic acid, a peroxysulfate, hydroxyl radical, sulphate radical, superoxide ion, ozone radical, and/or oxygen radical. The second active fluid in the second fluid mixture 25 can also preferably, but not necessarily, comprise at least one catalyst such as $Fe^{2+}$, $Fe^{3+}$, $Cu^{2+}$ and/or suitable nanoparticle catalysts. Other possible catalysts are nanocarbon type catalysts and perovskite type catalysts. Selection of the composition of a suitable second active fluid depends on the composition of the treated fluid 9 flowing in the fluid discharge pipe 10 and the desired result to be achieved. The second carrier fluid in the second fluid mixture 25 comprises preferably, but not necessarily, at least one of: air, nitrogen, oxygen, argon, inert gas and/or noble gas. The bubbles feeding step feeding bubbles of second fluid mixture 25 into treated fluid 9 flowing in the fluid discharge pipe 10 by means of an additional sparger apparatus 18 comprises preferably, but not necessarily, feeding bubbles of second fluid mixture 25 having a size between 0 and 100 μm or between 1 and 100 μm, preferably so that 90% of the bubbles of second fluid mixture 25 having a size between 30 and 100 μm, and more preferably so that 90% of the bubbles of second fluid mixture 25 having a size between 30 and 100 μm and so that the 50% of the bubbles of second fluid mixture 25 is within a range of 30 μm.

The first active fluid in the first fluid mixture 4 is preferably, but not necessarily, at least one of: oxygen, hydrogen peroxide, ozone, chlorine, a hypochlorite, a peroxide, a permanganate, a persulfate, a ferrate, peracetic acid, a peroxysulfate, hydroxyl radical, sulphate radical, superoxide ion, ozone radical, and/or oxygen radical.

The first active fluid in the first fluid mixture 4 can also preferably, but not necessarily, comprise at least one catalyst such as $Fe^{2+}$, $Fe^{3+}$, $Cu^{2+}$ and/or suitable nanoparticle catalysts. Other possible catalysts are nanocarbon type catalysts and perovskite type catalysts.

Selection of the composition of a suitable first active fluid depends on the composition of the fluid 3 and the result to be achieved.

The carrier fluid in the first fluid mixture 4 comprises preferably, but not necessarily, at least one of: air, nitrogen, oxygen, argon, inert gas, and/or noble gas.

In the ninth embodiment of the method illustrated in FIG. 9 and in the tenth embodiment of the method illustrated in FIG. 10, treated fluid 9 discharged in the fluid discharging step is used in a mineral beneficiation flotation step in a mineral beneficiation flotation arrangement 37. Treated fluid 9 is preferably, but not necessarily, fed in fluid discharging step in the fluid discharge pipe 10 to the mineral beneficiation flotation step. Treated fluid 9 can, as in the ninth embodiment presented in FIG. 9, be fed in the fluid discharging step in the fluid discharge pipe 10 to the mineral beneficiation flotation step via a grinding step that is performed in a grinder 38. Fluid 3 for the fluid feeding step can be received from the mineral beneficiation flotation step that is performed in the mineral beneficiation flotation arrangement 37. Fluid 3 for the fluid feeding step can be received from the mineral beneficiation flotation step that is performed in the mineral beneficiation flotation arrangement 37 via a gravity-based separation step that is performed in a gravity-based separator 39. Fluid 3 for the fluid feeding step can be received from the mineral beneficiation flotation step that is performed in the mineral beneficiation flotation arrangement 37 via a gravity-based separation step, which is performed in a gravity-based separator 39, and that is followed by a particle removing step, which is performed in a particle separator 40.

The particle removing step performed in the particle separator 40 is preferably, but not necessarily, cleaning flotation. Cleaning flotation can comprise feeding gas bubbles so that at least 90% of the gas bubbles having a diameter of from 0.2 to 250 μm into the fluid in the particle separator 40.

The particle removing step performed in the particle separator 40 is preferably, but not necessarily, dissolved air flotation (DAF). DAF is a flotation process which is used in various applications in water or effluent clarification. Solid particles are separated from fluid such liquid by using small flotation gas bubbles, which may be called microbubbles. The microbubbles are generated by dissolving air or other flotation gas into the fluid under pressure. The bubbles are formed in a pressure drop when dispersion is released. The particles of solid form attach to the bubbles and rise to the surface. A formed, floating sludge may be removed from the fluid surface with sludge rollers as DAF overflow. Chemicals may sometimes be needed to aid flocculation and increase solids removal efficiency.

The method comprises preferably, but not necessarily, additionally a step for discharging traces of solids and/or particles from the fluid reactor vessel 2 in addition to discharging first fluid mixture 4 and treated fluid 9.

The method can be solar operated so that power for the possible pumps for creating the flows of fluids and the flows of first fluid mixture 4 are obtained by using solar panels.

Next the system for treating fluid 3 and same preferred embodiments and variants of the system will be described in greater detail.

The system comprises a fluid feeding pipe 1 configured to feed fluid such a liquid or suspension into a fluid reactor vessel 2 that preferably, but not necessarily, is a liquid-gas reactor vessel.

The system comprises a sparger apparatus 5 in fluid connection with the fluid feeding pipe 1 and configured to feed bubbles of first fluid mixture 4 containing first carrier fluid and first active fluid into fluid 3 flowing in the fluid feeding pipe 1. The first fluid mixture 4 is preferably, but not necessarily, gas mixture. The first carrier fluid is preferably, but not necessarily, carrier gas. The first active fluid is preferably, but not necessarily, active gas.

The fluid feeding pipe 1 comprises a first reaction pipe section 24 downstream of the sparger apparatus 5 and upstream of the fluid reactor vessel 2. Components of the fluid 3 is configured be attracted to and attach to and/or to the bubbles of first fluid mixture 4 and/or fluid 3 is configured to react with the bubbles of first fluid mixture 4 in at least one of the first reaction pipe section 24 of the fluid feeding pipe 1 and the fluid reactor vessel 2.

The system comprises a first fluid source 7 for first fluid mixture 4 that is in fluid connection with the sparger apparatus 5 by means of a first fluid mixture feeding pipe 6. The first fluid mixture feeding pipe 6 is configured to feed first fluid mixture 4 containing first carrier fluid and first active fluid from the first fluid source 7 for first fluid mixture 4 to the sparger apparatus 5.

The system comprises a first fluid mixture return pipe 8 that is in fluid connection with the fluid reactor vessel 12 and that is in fluid connection with the first fluid source 7 for first fluid mixture 4. The fluid return pipe 8 is configured to feed first fluid mixture 4 from the fluid reactor vessel 2 to the first fluid source 7 for first fluid mixture 4.

The system comprises a first fluid analyzer 22 that can for example be in contact with one of the first fluid mixture feeding pipe 6, the first fluid mixture return pipe 8 and the first fluid source 7 for first fluid mixture 4 and that is configured to measure the relative content of first active fluid in the first fluid mixture 4. The system comprises a first active fluid source 23 in fluid connection with the first fluid source 7 for first fluid mixture 4. The first fluid analyzer 22 and the first active fluid source 23 are functionally connected and the first fluid analyzer 22 is configured to control the first active fluid source 23 in response to the measured relative content of first active fluid in the first fluid mixture 4.

The system comprises a fluid discharge pipe 10 that is in fluid connection with the fluid reactor vessel 2 and that is configured to discharge treated fluid 9 from the fluid reactor vessel 2.

The as analyzer 22 can also be functionally connected with a pump means 33 configured to add first carrier fluid in the form of air into the first fluid mixture 4 via an air inlet 32 from the ambient air as illustrated in FIG. 1.

The system can, as illustrated in FIG. 1, comprise an active fluid mixture return pipe 35 for feeding first fluid mixture 4 from the first fluid source 7 for first fluid mixture 4 to the first active fluid source 23 for first active fluid.

The fluid feeding pipe 1 comprises preferably, but not necessarily, a fluid storage tank 11 provided in the fluid feeding pipe 1 upstream of the sparger apparatus 5. A purpose of such fluid storage tank 11 is to make the flow of fluid 3 in the fluid feeding pipe 1 even before the sparger 5 by providing an intermediate storage or a buffer for fluid.

If the fluid feeding pipe 1 comprises a fluid storage tank 11 provided in the fluid feeding pipe 1 upstream of the sparger apparatus 5, the system comprises preferably, but not necessarily, as illustrated in FIG. 5, a fluid return pipe 12 in fluid connection with the fluid reactor vessel 2 and in fluid connection with the fluid storage tank 11. The fluid return pipe 12 is configured to feed return fluid from the fluid reactor vessel 2 to the fluid storage tank 11.

An UV-source 13 is preferably, but not necessarily, provided downstream of the sparger apparatus 5 in the fluid feeding pipe 1. The UV-source 13 is configured to subject fluid 3 and first fluid mixture 4 flowing in the fluid feeding pipe 1 to UV-radiation. A purpose of such UV-radiation can be to make ionized fluid of components in the first fluid mixture.4 and so to enhance and promote adhering of impurities contained in the fluid 3 to the tiny bubbles of first fluid mixture 4 provided in the fluid 3 by means of the sparger apparatus 6. Another purpose of such UV can be to product radicals in the first fluid mixture 4 and this promotes the oxidizing or reduction effect and/or to eliminate possible micro-organisms and microbes. Because the fluid 3 contains bubbles of first fluid mixture 4, the effect of the UV radiation is more effective than if the bubbles were not present, because the bubbles of first fluid mixture 4, which preferable are in the form of gas bubbled of first fluid mixture 4, enables for a deeper penetration of the UV-radiation into fluid 3.

A fluid pump means 14 is preferably, but not necessarily, provided in the fluid feeding pipe 1 and configured to create a flow of fluid 3 in the fluid feeding pipe 1.

A fluid mixture pumping means 15 such as a fan is preferably, but not necessarily, provided in the first fluid mixture feeding pipe 6 and configured to create a flow of first fluid mixture 4 in the first fluid mixture feeding pipe 6.

The first fluid mixture feeding pipe 6 comprises preferably, but not necessarily, a fluid mixture tank 16 that is configured to contain first fluid mixture 4 and that is in fluid connection with the first fluid mixture feeding pipe 6 and also preferably, but not necessarily, in fluid connection with the first fluid mixture return pipe 8.

The sparger apparatus 5 is preferably, but not necessarily, configured to feed bubbles of first fluid mixture 4 fed into the fluid 3 flowing in the fluid feeding pipe 1 having a size between 0 and 100 µm or between 1 and 100 µm, preferably so that 90% of the bubbles of first fluid mixture 4 has a size between 30 and 100 µm, and more preferably so that 90% of the bubbles of first fluid mixture 4 has a size between 30 and 100 µm and so that the 50% of the bubbles of first fluid mixture 4 is within a range of 30 µm.

In the system, the fluid discharge pipe 10 can, as in the second embodiment of the system illustrated in FIG. 2, in the fourth embodiment of the system illustrated in FIG. 4, and in the seventh embodiment of the system illustrated in FIG. 7, be in fluid connection with an additional fluid reactor vessel 17, which preferably, but not necessarily, is a liquid-gas reactor vessel, so that the fluid discharge pipe 10 is configured to feed treated fluid 9 from the fluid reactor vessel 2 to the additional fluid reactor vessel 17. In such embodiments of the system, an additional sparger apparatus 18 is arranged in fluid connection with the fluid discharge pipe 10. The additional sparger apparatus 18 is configured to feed bubbles of first fluid mixture 4 into treated fluid 9 flowing in the fluid discharge pipe 10. In such embodiments of the system, the first fluid source 7 for first fluid mixture 4 is additionally in fluid connection with the additional sparger apparatus 18 by means of the first fluid mixture feeding pipe 6. In such embodiments of the system, the first fluid mixture feeding pipe 6 is additionally configured to feed first fluid mixture 4 from the first fluid source 7 for first fluid mixture 4 to the additional sparger apparatus 18. In such embodiments of the system, the first fluid mixture return pipe 8 is additionally in fluid connection with the additional fluid reactor vessel 17. In such embodiments of the system, the first fluid mixture return pipe 8 is configured to feed first fluid mixture 4 to the first fluid source 7 for first fluid mixture 4 from the additional fluid reactor vessel 17. The fluid discharge pipe 10 comprises a second reaction pipe section 34 downstream of the additional sparger apparatus 18 and upstream of the additional fluid reactor vessel 17. Components of the treated fluid 9 is configured be attracted to and attach to bubbles of the first fluid mixture 4 and/or components of the treated fluid 9 is configured to react with bubbles of the first fluid mixture 4 in at least one of the second reaction pipe section 34 of the fluid discharge pipe 10 and the additional fluid reactor vessel 17. In such embodiments of the system, an additional fluid discharge pipe 19 is provided in fluid connection with the additional fluid reactor vessel 17. The additional fluid discharge pipe 19 is configured to discharge treated fluid 9 from the additional fluid reactor vessel 17. In such embodiments of the system, the system can comprise an additional UV-source 20 downstream of the additional sparger apparatus 18 in the fluid discharge pipe 10. The additional UV-source 20 is configured to subject treated fluid 9 flowing in the fluid discharge pipe 10 to UV-radiation. A purpose of such UV-radiation can be to make ionized fluid of components in the first fluid mixture 4 and so to enhance and promote adhering of impurities contained in the treated fluid 9 to the bubbles of first fluid mixture 4 provided in the treated fluid 9 by means of the additional sparger apparatus 18. In such embodiments, the system can comprise an additional fluid pump means 21 provided in the fluid discharge pipe 10. The additional fluid pump means 21 is configured to create a flow of treated fluid 9 in the fluid discharge pipe 10. The additional sparger apparatus 18 is preferably, but not necessarily, configured to feed bubbles of first fluid mixture 4 into the treated fluid 9 flowing in the fluid discharge pipe 10 having a size between 0 and 100 µm or between 1 and 100 µm, preferably so that 90% of the bubbles of first fluid mixture 4 has a size between 30 and 100 µm, and more preferably so that 90% of the bubbles of first fluid mixture 4 has a size between 30 and 100

μm and so that the 50% of the bubbles of first fluid mixture 4 is within a range of 30 μm.

In the system the fluid discharge pipe 10 can, as in the eight embodiment illustrated in FIG. 8 be in fluid connection with an additional fluid reactor vessel 17, which preferably, but not necessarily, is a liquid-gas reactor vessel, and be configured to feed treated fluid 9 from the fluid reactor vessel 2 to the additional fluid reactor vessel 17. In this eight embodiment of the system, an additional sparger apparatus 18 is in fluid connection with the fluid discharge pipe 10 and configured to feed bubbles of second fluid mixture 25 containing second carrier fluid and second active fluid into treated fluid 9 flowing in the fluid discharge pipe 10. The second fluid mixture 25 has preferably, but not necessarily, a different composition than the first fluid mixture 4. In this eight embodiment of the system, the fluid discharge pipe 10 comprises a second reaction pipe section 34 downstream of the additional sparger apparatus 18 and upstream of the additional fluid reactor vessel 17. Components of the treated fluid 9 is configured be attracted to and attach to bubbles of the second fluid mixture 25 and/or components of the treated fluid 9 and bubbles of second fluid mixture 25 is configured to react in at least one of the second reaction pipe section 34 of the fluid discharge pipe 10 and the additional fluid reactor vessel 17. This eight embodiment of the system comprises a second fluid source 27 for second fluid mixture 25. The second fluid source 27 is in fluid connection with the additional sparger apparatus 18 by means of a second fluid mixture feeding pipe 26 configured to feed second feed fluid mixture 25 from the second fluid source 27 for second fluid mixture 25 to the additional sparger apparatus 18. This eight embodiment of the system comprises a second fluid mixture return pipe 29 that is in fluid connection with the additional fluid reactor vessel 17 and that is in fluid connection with the second fluid source 27 for second fluid mixture 25 and that is configured to feed second feed fluid mixture 25 from the additional fluid reactor vessel 17 to the second fluid source 27 for second fluid mixture 25. This eight embodiment comprises a second fluid analyzer 28 that is configured to measure the relative content of second active fluid in the second fluid mixture 25 and that can for example be in contact with the second fluid mixture 25 in one of the second fluid mixture feeding pipe 26, the second fluid mixture return pipe 29, and the second fluid source 27 for second fluid mixture 25. This eight embodiment comprises a second active fluid source 30 in fluid connection with the second fluid source 27 for second fluid mixture 25. The second fluid analyzer 28 and the second active fluid source 30 are functionally connected, and the second fluid analyzer 28 is configured to control the second active fluid source 30 in response to the measured relative content of second active fluid in the second fluid mixture 25. This eight embodiment comprises an additional fluid discharge pipe 19 that is in fluid connection with the additional fluid reactor vessel 17 and that is configured to discharge treated fluid 9 from the additional fluid reactor vessel 17. The second fluid mixture 25 is preferably, but not necessarily, gas mixture. The second carrier fluid is preferably, but not necessarily, carrier gas. The second active fluid is preferably, but not necessarily, active gas component. The second active fluid in the second fluid mixture 25 is preferably, but not necessarily, at least one of oxygen, hydrogen peroxide, ozone, chlorine, a hypochlorite, a peroxide, a permanganate, a persulfate, a ferrate, peracetic acid, a peroxysulfate, hydroxyl radical, sulphate radical, superoxide ion, ozone radical, and/or oxygen radical. The second active fluid in the second fluid mixture 25 can also preferably, but not necessarily, comprise at least one catalyst such as $Fe^{2+}$, $Fe^{3+}$, $Cu^{2+}$ and/or suitable nanoparticle catalysts. Selection of the composition of a suitable second active fluid depends on the composition of the treated fluid 9 flowing in the fluid discharge pipe 10 and the desired result to be achieved The second carrier fluid in the second fluid mixture 25 comprises preferably, but not necessarily, at least one of air, nitrogen, oxygen, argon, inert gas and/or noble gas. The additional sparger apparatus 18 is preferably, but not necessarily, configured to feed bubbles of second fluid mixture 25 into the treated fluid 9 flowing in the fluid discharge pipe 10 having a size between 0 and 100 μm or 1 and 100 μm, preferably so that 90% of the bubbles of second fluid mixture 25 has a size between 30 and 100 μm, and more preferably so that 90% of the bubbles of second fluid mixture 25 has a size between 30 and 100 μm and so that the 50% of the bubbles of second fluid mixture 25 is within a range of 30 μm.

The first active fluid in the first fluid mixture 4 is preferably, but not necessarily, at least one of: oxygen, hydrogen peroxide, ozone, chlorine, a hypochlorite, a peroxide, a permanganate, a persulfate, a ferrate, peracetic acid, a peroxysulfate, hydroxyl radical, sulphate radical, superoxide ion, ozone radical, and/or oxygen radical.

The first active fluid in the first fluid mixture 4 can also preferably, but not necessarily, comprise at least one catalyst such as $Fe^{2+}$, $Fe^{3+}$, $Cu^{2+}$ and/or suitable nanoparticle catalysts. Other possible catalysts are nanocarbon type catalysts and perovskite type catalysts.

Selection of the composition of a suitable first active fluid depends on the composition of the fluid 3 and the result to be achieved.

The carrier fluid in the first fluid mixture 4 comprises preferably, but not necessarily, at least one of air, nitrogen, oxygen, argon, inert gas, and/or noble gas.

The system can, as in the ninth embodiment illustrated in FIG. 9 and in the tenth embodiment illustrated in FIG. 10 be in fluid connection with a mineral beneficiation flotation arrangement 37 comprising flotation vessels 36 arranged in series. In such embodiments of the system, the system is preferably, but not necessarily, configured to feed treated fluid 9 to the mineral beneficiation flotation arrangement 37. In such embodiments of the system, the system is preferably, but not necessarily, configured to feed treated fluid 9 to the mineral beneficiation flotation arrangement 37 upstream of the first flotation vessel 36 of said flotation vessels 36 arranged in series. In such embodiments of the system, the system is preferably, but not necessarily, configured to feed treated fluid 9 to a grinder 38 that is in fluid connection with the first flotation vessel 36 of said flotation vessels 36 arranged in series, as in the ninth embodiment of the system illustrated in FIG. 9. The system can be configured to receive fluid 3 from the mineral beneficiation flotation arrangement 37. The fluid feeding pipe 1 of the system can be configured to receive fluid from the last flotation vessel 36 of said flotation vessels 36 arranged in series. The fluid feeding pipe 1 of the system can be configured to receive fluid from the last flotation vessel 36 of said flotation vessels 36 arranged in series via a gravity-based separator 39. The fluid feeding pipe 1 of the system can being configured to receive fluid from the last flotation vessel 36 of said flotation vessels 36 arranged in series via a particle separator 40 that is arranged downstream of a gravity-based separator 39 that is in fluid connection with the last flotation vessel 36 of said flotation vessels 36 arranged in series and that is in fluid connection with the gravity-based separator 39.

The particle separator 40 utilizes preferably, but not necessarily, cleaning flotation. Cleaning flotation can comprise feeding gas bubbles so that at least 90% of the gas bubbles having a diameter of from 0.2 to 250 µm into the fluid in the particle separator 40.

The particle separator 40 can alternatively utilize dissolved air flotation (DAF). DAF is a flotation process which is used in various applications in water or effluent clarification. Solid particles are separated from fluid such liquid by using small flotation gas bubbles, which may be called microbubbles. The microbubbles are generated by dissolving air or other flotation gas into the fluid under pressure. The bubbles are formed in a pressure drop when dispersion is released. The particles of solid form attach to the bubbles and rise to the surface. A formed, floating sludge may be removed from the fluid surface with sludge rollers as DAF overflow. Chemicals may sometimes be needed to aid flocculation and increase solids removal efficiency.

The system comprises preferably, but not necessarily, additionally solids discharging means for discharging traces of solids and/or particles from the fluid reactor vessel 2 in addition to first fluid mixture 4 and treated fluid 9.

The system can be solar operated so that power for the possible pumps for creating the flows of fluids and the flows of fluid mixture are obtained by using solar panels.

The sparger apparatus 5 and the possible additional sparger apparatus 18 is/are preferably, but not necessarily, the sparger apparatus presented in document WO 2019/012179 and the content of document WO 2019/012179 is hereby incorporated by reference.

Next the flotation arrangement and some embodiment and variants of the flotation arrangement will be described in greater detail. FIG. 11 shows an embodiment of the flotation arrangement.

The flotation arrangement comprises a mineral beneficiation flotation arrangement 37 comprising flotation vessels 36 arranged in series, a grinder 38 that is in fluid connection with the first flotation vessel 36 of said flotation vessels 36 arranged in series.

The flotation arrangement at least two systems 41a and 41b for treating fluid according to any embodiment presented earlier.

A first of said least two systems 41a for treating fluid is in fluid connection with the grinder 38 of the mineral beneficiation flotation arrangement 37 and configured to feed treated fluid 9 to the grinder 38 of the mineral beneficiation flotation arrangement 37.

A second of said least two systems 41b for treating fluid is in fluid connection with the mineral beneficiation flotation arrangement 37 at a point downstream of the grinder (38) of the mineral beneficiation flotation arrangement 37 and upstream of the first flotation vessel 36 of said flotation vessels 36 arranged in series of the mineral beneficiation flotation arrangement 37 and configured to feed treated fluid 9 to said point downstream of the grinder 38 of the mineral beneficiation flotation arrangement 37 and upstream of the first flotation vessel 36 of said flotation vessels 36 arranged in series of the mineral beneficiation flotation arrangement 37.

In the flotation arrangement said at least two systems 41a and 41b are preferably, but not necessarily, configured to receive fluid 3 from the last flotation vessel 36 of said flotation vessels 36 arranged in series of the mineral beneficiation flotation arrangement 37.

In the flotation arrangement said at least two systems 41a and 41b are preferably, but not necessarily, configured to receive fluid 3 from the last flotation vessel 36 of said flotation vessels 36 arranged in series of the mineral beneficiation flotation arrangement 37 via a gravity-based separator 39 that is configured to remove particles from the fluid upstream of said at least two systems 41a and 41b.

In the flotation arrangement said at least two systems 41a and 41b are preferably, but not necessarily, configured to receive fluid 3 from the last flotation vessel 36 of said flotation vessels 36 arranged in series of the mineral beneficiation flotation arrangement 37 via a gravity-based separator 39 that is configured to remove particles from the fluid upstream of said at least two systems 41a and 41b and via a particle separator 40 that is arranged downstream of the gravity-based separator 39 and that is configured to remove small particles from the fluid upstream of said at least two systems 41a and 41b.

The particle separator 40 utilizes preferably, but not necessarily, cleaning flotation. Cleaning flotation can comprise feeding gas bubbles so that at least 90% of the gas bubbles having a diameter of from 0.2 to 250 µm into the fluid in the particle separator 40.

The particle separator 40 can alternatively utilize dissolved air flotation (DAF). DAF is a flotation process which is used in various applications in water or effluent clarification. Solid particles are separated from fluid such liquid by using small flotation gas bubbles, which may be called microbubbles. The microbubbles are generated by dissolving air or other flotation gas into the fluid under pressure. The bubbles are formed in a pressure drop when dispersion is released. The particles of solid form attach to the bubbles and rise to the surface. A formed, floating sludge may be removed from the fluid surface with sludge rollers as DAF overflow. Chemicals may sometimes be needed to aid flocculation and increase solids removal efficiency.

It is apparent to a person skilled in the art that as technology advances, the basic idea of the invention can be implemented in various ways. The invention and its embodiments are therefore not restricted to the above examples, but they may vary within the scope of the claims.

The invention claimed is:

1. A method for treating fluid, wherein the method comprises:
   a fluid feeding step for feeding fluid in a fluid feeding pipe into a fluid reactor vessel,
   a bubbles feeding step for feeding bubbles of first fluid mixture containing first carrier fluid and first active fluid into fluid flowing in the fluid feeding pipe by means of a sparger apparatus in fluid connection with the fluid feeding pipe,
   a fluid mixture feeding step for feeding first fluid mixture to the sparger apparatus in a first fluid mixture feeding pipe from a first fluid source for first fluid mixture that is in fluid connection with the first fluid source for first fluid mixture and that is in fluid connection with the sparger apparatus by means of the first fluid mixture feeding pipe,
   wherein first fluid mixture is configured to react with said fluid in a reaction step in at least one of a first reaction pipe section of the fluid feeding pipe, which first reaction pipe section the fluid feeding pipe is downstream of the sparger apparatus and upstream of the fluid reactor vessel, and the fluid reactor vessel,
   a fluid mixture discharging step for discharging first fluid mixture from the fluid reactor vessel and for feeding first fluid mixture to the first fluid source for first fluid mixture in a first fluid mixture return pipe that is in fluid connection with the fluid reactor vessel and with the first fluid source for first fluid mixture, a fluid mixture analyzing step for measuring the relative content of first active fluid in the first fluid mixture with a first fluid analyzer, by functionally connecting a first active fluid source in fluid connection with the first fluid source for first fluid mixture, by functionally connecting the first fluid analyzer and the first active fluid source, by controlling the first active fluid source with the first fluid analyzer in response to the relative content of first active fluid in the first fluid mixture as measured by the first fluid analyzer, and a fluid discharging step for discharging treated fluid from the fluid reactor vessel by means of fluid discharge pipe that is in fluid connection with the fluid reactor vessel, and by using treated fluid discharged in the fluid discharging step in a mineral beneficiation flotation step characterized by feeding treated fluid in the fluid discharging step in the fluid discharge pipe to an additional fluid reactor vessel, by the bubbles feeding step comprise additionally feeding bubbles of first fluid mixture into treated fluid flowing in the fluid discharge pipe by means of an additional sparger apparatus in fluid connection with the fluid discharge pipe, by the fluid mixture feeding step comprises additionally feeding first fluid mixture to the additional sparger apparatus with the first fluid mixture feeding pipe from the first fluid source for first fluid mixture, wherein the first fluid mixture feeding pipe is additionally in fluid connection with the additional sparger apparatus, wherein first fluid mixture is configured to react with said treated fluid in a reaction step in at least one of a second reaction pipe section of the fluid discharge pipe, which second reaction pipe section of the fluid discharge pipe is downstream of the additional sparger apparatus and upstream of the additional fluid reactor vessel, and the additional fluid reactor vessel, by the fluid mixture discharging step comprise additionally discharging first fluid mixture from the additional fluid reactor vessel and for feeding first fluid mixture to the first fluid source for first fluid mixture in the first fluid mixture return pipe that is additionally in fluid connection with the additional fluid reactor vessel, and by the fluid discharging step comprise additionally discharging treated fluid from the additional fluid reactor vessel by means of an additional fluid discharge pipe that is in fluid connection with the additional fluid reactor vessel.

2. The method according to claim 1, wherein the fluid feeding step comprises feeding fluid into the fluid reactor vessel in the fluid feeding pipe via a fluid storage tank provided in the fluid feeding pipe upstream of the sparger apparatus.

3. The method according to claim 2, wherein a fluid return step for feeding fluid from the fluid reactor vessel in a fluid return pipe to the fluid storage tank.

4. The method according to claim 1, wherein the fluid feeding step comprises subjecting fluid and first fluid mixture flowing in the fluid feeding pipe to UV-radiation by means of an UV-source provided downstream of the sparger apparatus in the fluid feeding pipe.

5. The method according to claim 1, wherein the fluid feeding step comprises creating a flow of fluid in the fluid feeding pipe by means of a fluid pump means provided in the feeding pipe.

6. The method according to claim 1, wherein the fluid mixture feeding step comprises creating a flow of first fluid mixture in the first fluid mixture feeding pipe by means of a fluid mixture pumping means provided in the first fluid mixture feeding pipe.

7. The method according to claim 1, wherein the fluid mixture feeding step comprises feeding to the sparger apparatus via a fluid mixture tank that is configured to contain first fluid mixture and that is in fluid connection with the first fluid mixture feeding pipe.

8. The method according to claim 1, wherein the size of the bubbles of first fluid mixture that is fed by means of the sparger apparatus being between 0 to 100 µm.

9. A method for treating fluid, wherein the method comprises:

a fluid feeding step for feeding fluid in a fluid feeding pipe into a fluid reactor vessel, a bubbles feeding step for feeding bubbles of first fluid mixture containing first carrier fluid and first active fluid into fluid flowing in the fluid feeding pipe by means of a sparger apparatus in fluid connection with the fluid feeding pipe, a fluid mixture feeding step for feeding first fluid mixture to the sparger apparatus in a first fluid mixture feeding pipe from a first fluid source for first fluid mixture that is in fluid connection with the first fluid source for first fluid mixture and that is in fluid connection with the sparger apparatus by means of the first fluid mixture feeding pipe, wherein first fluid mixture is configured to react with said fluid in a reaction step in at least one of a first reaction pipe section of the fluid feeding pipe, which first reaction pipe section the fluid feeding pipe is downstream of the sparger apparatus and upstream of the fluid reactor vessel, and the fluid reactor vessel, a fluid mixture discharging step for discharging first fluid mixture from the fluid reactor vessel and for feeding first fluid mixture to the first fluid source for first fluid mixture in a first fluid mixture return pipe that is in fluid connection with the fluid reactor vessel and with the first fluid source for first fluid mixture, a fluid mixture analyzing step for measuring the relative content of first active fluid in the first fluid mixture with a first fluid analyzer, by functionally connecting a first active fluid source in fluid connection with the first fluid source for first fluid mixture, by functionally connecting the first fluid analyzer and the first active fluid source, by controlling the first active fluid source with the first fluid analyzer in response to the relative content of first active fluid in the first fluid mixture as measured by the first fluid analyzer, and a fluid discharging step for discharging treated fluid from the fluid reactor vessel by means of fluid discharge pipe that is in fluid connection with the fluid reactor vessel, and by using treated fluid discharged in the fluid discharging step in a mineral beneficiation flotation step, characterized by feeding treated fluid in the fluid discharging step in the fluid discharge pipe to an additional fluid reactor vessel, by the bubbles feeding step comprise additionally feeding bubbles of a second fluid mixture containing second carrier fluid and second active fluid into treated fluid flowing in the fluid discharge pipe by means of an additional sparger apparatus that is in fluid connection with the fluid discharge pipe, by the fluid mixture feeding step comprises additionally feeding second fluid mixture to the additional sparger apparatus with a second fluid mixture feeding pipe from a second fluid source for second fluid mixture that is in fluid connection with the second fluid source for second fluid mixture and that is in fluid connection with the additional sparger apparatus with the second fluid mixture feeding pipe, wherein second fluid mixture is configured to react with said treated fluid in an additional reaction step in at least one of a second reaction pipe section of the fluid discharge pipe, which second reaction pipe section of the fluid discharge pipe is downstream of the additional sparger apparatus and upstream of the additional fluid reactor vessel, and the additional fluid reactor vessel, by the fluid mixture discharging step comprise additionally discharging second fluid mixture from the additional fluid reactor vessel and for feeding second fluid mixture in a second fluid return pipe to the second fluid source for second fluid mixture with the second fluid return pipe that is in fluid connection with the additional fluid reactor vessel and that is in fluid connection with the second fluid source for second fluid mixture, by a second fluid mixture analyzing step for measuring the relative content of second active fluid in the second fluid mixture with a second fluid analyzer, by functionally connecting a second active fluid source in fluid connection with the second fluid source for second fluid mixture, by functionally connecting the second fluid analyzer and the second active fluid source, by controlling the second active fluid source with the second fluid analyzer in response to the relative content of second active fluid in the second fluid mixture as measured by the second fluid analyzer, and by the fluid discharging step comprise additionally discharging treated fluid from the additional fluid reactor vessel by means of an additional fluid discharge pipe that is in fluid connection with the additional fluid reactor vessel.

10. The method according to claim 1, wherein the fluid feeding step comprises additionally subjecting treated fluid and second active fluid mixture flowing in the fluid discharge pipe to UV-radiation by means of an additional UV-source provided downstream of the additional sparger apparatus in the fluid discharge pipe.

11. The method according to claim 1, wherein the fluid feeding step comprises additionally creating a flow of treated fluid in the fluid discharge pipe by means of an additional fluid pump means provided in the fluid discharge pipe.

12. The method according claim 1, wherein the size of the bubbles of first fluid mixture that is fed by means of the additional sparger apparatus being between 0 to 100 µm.

13. The method according to claim 1, wherein the active fluid comprising at least one of oxygen, hydrogen peroxide, ozone, chlorine, a hypochlorite, a peroxide, a permanganate, a persulfate, a ferrate, peracetic acid, a peroxysulfate, hydroxyl radical, sulphate radical, superoxide ion, ozone radical, and/or oxygen radical.

14. The method according to claim 1, wherein the active fluid comprising at least one catalyst selected from a group consisting of $Fe^{2+}$, $Fe^{3+}$, $Cu^{2+}$ and suitable nanoparticle catalysts.

15. The method according to claim 1, wherein the first carrier fluid comprising at least one of air, nitrogen, oxygen, argon, inert gas, and/or noble gas.

16. The method according to claim 1, characterized by feeding treated fluid in the fluid discharging step in the fluid discharge pipe to the mineral beneficiation flotation step.

17. The method according to claim 16, characterized by feeding treated fluid in the fluid discharging step in the fluid discharge pipe to the mineral beneficiation flotation step via a grinding step.

18. The method according to claim 16, characterized by receiving fluid for the fluid feeding step from the mineral beneficiation flotation step.

19. The method according to claim 18, characterized by receiving fluid for the fluid feeding step from a mineral beneficiation flotation step via a gravity-based separation step.

20. The method according to claim 18, characterized by receiving fluid for the fluid feeding step from a mineral beneficiation flotation step via a gravity-based separation step followed by a particle removing step.

21. A system for treating fluid, wherein the system comprises a fluid feeding pipe configured to feed fluid into a fluid reactor vessel, a sparger apparatus in fluid connection with the fluid feeding pipe and configured to feed bubbles of first fluid mixture containing first carrier fluid and first active fluid into fluid flowing in the fluid feeding pipe, wherein the fluid feeding pipe comprises a first reaction pipe section downstream of the sparger apparatus and upstream of the fluid reactor vessel and wherein first fluid mixture and fluid is configured to react in at least one of the first reaction pipe section of the fluid feeding pipe and the fluid reactor vessel, a first fluid source for first fluid mixture that is in fluid connection with the sparger apparatus by means of a first fluid mixture feeding pipe configured to feed first fluid mixture from the first fluid source for first fluid mixture to the sparger apparatus, a first fluid mixture return pipe that is in fluid connection with the fluid reactor vessel and with the first fluid source for first fluid mixture and that is configured to feed first fluid mixture from the fluid reactor vessel to the first fluid source for first fluid mixture, a first fluid analyzer in contact with the first fluid mixture and configured to measure the relative content of first active fluid in the first fluid mixture, a first active fluid source in fluid connection with the first fluid source for first fluid mixture, wherein the first fluid analyzer and the first active fluid source being functionally connected, by the first fluid analyzer being configured to control the first active fluid source in response to the measured relative content of first active fluid in the first fluid mixture, and a fluid discharge pipe that is in fluid connection with the fluid reactor vessel and that is configured to discharge treated fluid from the fluid reactor vessel, and by the system being in fluid connection with a mineral beneficiation flotation arrangement comprising flotation vessels arranged in series, wherein the fluid discharge pipe being in fluid connection with an additional fluid reactor vessel and configured to feed treated fluid from the fluid reactor vessel to the additional fluid reactor vessel, by an additional sparger apparatus in fluid connection with the fluid discharge pipe and configured to feed bubbles of first fluid mixture into treated fluid flowing in the fluid discharge pipe, wherein the fluid discharge pipe comprises a second reaction pipe section downstream of the additional sparger apparatus and upstream of the additional fluid reactor vessel and wherein first fluid mixture and treated fluid is configured to react in at least one of the second reaction pipe section of the fluid discharge pipe and the additional fluid reactor vessel, by the first fluid source for first fluid mixture is additionally in fluid connection with the additional sparger apparatus by means of the first fluid mixture feeding pipe and by the first fluid mixture feeding pipe being additionally configured to feed fluid mixture from the first fluid source for first fluid mixture to the additional sparger apparatus, by the first fluid mixture return pipe being additionally in fluid connection with the additional fluid reactor vessel and for feeding first fluid mixture to the first fluid source for first fluid mixture in the first fluid mixture return pipe from the additional fluid reactor vessel to the first fluid source for first fluid mixture, and by an additional fluid discharge pipe that is in fluid connection with the additional fluid reactor vessel and that is configured to discharge treated fluid from the additional fluid reactor vessel.

22. The system according to claim 21, wherein the fluid feeding pipe comprises a fluid storage tank provided in the fluid feeding pipe upstream of the sparger apparatus.

23. The system according to claim 22, wherein a fluid return pipe in fluid connection with the fluid reactor vessel and with the fluid storage tank and configured to feed return fluid from the fluid reactor vessel.

24. The system according to claim 21, wherein an UV-source provided downstream of the sparger apparatus in the fluid feeding pipe and configured to subject fluid and first fluid mixture flowing the fluid feeding pipe to UV-radiation.

25. The system according to claim 21, wherein a fluid pump means provided in the feeding pipe and configured to create a flow of fluid the fluid feeding pipe.

26. The system according to claim 21, wherein a fluid mixture pumping means provided in the first fluid mixture feeding pipe and configured to create a flow of first fluid mixture in the first fluid mixture feeding pipe.

27. The system according to claim 21, wherein the first fluid mixture feeding pipe comprising a fluid mixture tank that is configured to contain first fluid mixture.

28. The system according to claim 21, wherein the sparger apparatus being configures to produce bubbles of first fluid mixture having a bubble size between 0 to 100 μm.

29. A system for treating fluid, wherein the system comprises:
  a fluid feeding pipe configured to feed fluid into a fluid reactor vessel,
  a sparger apparatus in fluid connection with the fluid feeding pipe and configured to feed bubbles of first fluid mixture containing first carrier fluid and first active fluid into fluid flowing in the fluid feeding pipe, wherein the fluid feeding pipe comprises a first reaction pipe section downstream of the sparger apparatus and upstream of the fluid reactor vessel and wherein first fluid mixture and fluid is configured to react in at least one of the first reaction pipe section of the fluid feeding pipe and the fluid reactor vessel,
  a first fluid source for first fluid mixture that is in fluid connection with the sparger apparatus by means of a first fluid mixture feeding pipe configured to feed first fluid mixture from the first fluid source for first fluid mixture to the sparger apparatus,
  a first fluid mixture return pipe that is in fluid connection with the fluid reactor vessel and with the first fluid source for first fluid mixture and that is configured to feed first fluid mixture from the fluid reactor vessel to the first fluid source for first fluid mixture,
  a first fluid analyzer in contact with the first fluid mixture and configured to measure the relative content of first active fluid in the first fluid mixture,
  a first active fluid source in fluid connection with the first fluid source for first fluid mixture,
  wherein the first fluid analyzer and the first active fluid source being functionally connected,
  by the first fluid analyzer being configured to control the first active fluid source in response to the measured relative content of first active fluid in the first fluid mixture, and
  a fluid discharge pipe that is in fluid connection with the fluid reactor vessel and that is configured to discharge treated fluid from the fluid reactor vessel,
  and by the system being in fluid connection with a mineral beneficiation flotation arrangement comprising flotation vessels arranged in series,
  wherein the fluid discharge pipe being in fluid connection with an additional fluid reactor vessel and configured to feed treated fluid from the fluid reactor vessel to the additional fluid reactor vessel,
  by an additional sparger apparatus in fluid connection with the fluid discharge pipe and configured to feed bubbles of second fluid mixture containing second carrier fluid and second active fluid into treated fluid flowing in the fluid discharge pipe, wherein the fluid discharge pipe comprises a second reaction pipe section downstream of the additional sparger apparatus and upstream of the additional fluid reactor vessel and wherein second fluid mixture and treated fluid is configured to react in at least one of the second reaction pipe section of the fluid feeding pipe and the additional fluid reactor vessel,
  a second fluid source for second fluid mixture that is in fluid connection with the additional sparger apparatus by means of a second fluid mixture feeding pipe configured to feed second fluid mixture from the second fluid source for second fluid mixture to the additional sparger apparatus,
  a second fluid mixture return pipe that is in fluid connection with the additional fluid reactor vessel and that is in fluid connection with the second fluid source for second fluid mixture and that is configured to feed second feed fluid mixture from the additional fluid reactor vessel to the second fluid source for second fluid mixture,
  a second fluid analyzer configured to measure the relative content of second active fluid in the second fluid mixture,
  a second active fluid source in fluid connection with the second fluid source for second fluid mixture,
  wherein the second fluid analyzer and the second active fluid source being functionally connected,
  by the second fluid analyzer being configured to control the second active fluid source in response to the measured relative content of second active fluid in the second fluid mixture, and
  by an additional fluid discharge pipe that is in fluid connection with the additional fluid reactor vessel and that is configured to discharge treated fluid from the additional fluid reactor vessel.

30. The system according to claim 21, wherein an additional UV-source provided downstream of the additional sparger apparatus in the fluid discharge pipe and configured to subject treated fluid flowing in the fluid discharge pipe to UV-radiation.

31. The system according to claim 21, wherein an additional fluid pump means provided in the fluid discharge pipe and configured to create a flow of treated fluid in the fluid discharge pipe.

32. The system according to claim 21, wherein the additional sparger apparatus being configured to product bubbles of first fluid mixture having a bubble size between 0 to 100 µm.

33. The system according to claim 21, wherein the active fluid comprising at least one of oxygen, hydrogen peroxide, ozone, chlorine, a hypochlorite, a peroxide, a permanganate, a persulfate, a ferrate, peracetic acid, a peroxysulfate, hydroxyl radical, sulphate radical, superoxide ion, ozone radical and/or oxygen radical.

34. The system according to claim 21, wherein the active fluid comprising at least one catalyst selected from a group consisting of $Fe^{2+}$, $Fe^{3+}$, $Cu^{2+}$, and suitable nanoparticle catalysts.

35. The system according to claim 21, wherein the first carrier fluid comprising at least one of air, nitrogen, oxygen, argon, inert gas and/or noble gas.

36. The system according to claim 21, wherein the system being configured to feed treated fluid to the mineral beneficiation flotation arrangement.

37. The system according to claim 36, wherein the system being configured to feed treated fluid to the mineral beneficiation flotation arrangement upstream of the first flotation vessel of said flotation vessels arranged in series.

38. The system according to claim 36, wherein the system being configured to feed treated fluid to a grinder that is in fluid connection with the first flotation vessel of said flotation vessels arranged in series.

39. The system according to claim 21, wherein the system being configured to receive fluid from the mineral beneficiation flotation arrangement.

40. The system according to claim 39, wherein the fluid feeding pipe of the system being configured to receive fluid from the last flotation vessel of said flotation vessels arranged in series.

41. The system according to claim 40, wherein the fluid feeding pipe of the system being configured to receive fluid from the last flotation vessel of said flotation vessels arranged in series via a gravity-based separator.

42. The system according to claim 40, wherein the fluid feeding pipe of the system being configured to receive fluid from the last flotation vessel of said flotation vessels in series via a particle separator that is arranged downstream of a gravity-based separator that is in fluid connection with the last flotation vessel of said flotation vessels arranged in series and that is in fluid connection with the gravity-based separator.

43. A flotation arrangement comprising:
a mineral beneficiation flotation arrangement comprising flotation vessels arranged in series, a grinder that is in fluid connection with the first flotation vessel of said flotation vessels arranged in series, and
at least two systems for treating fluid each system comprising:
a fluid feeding pipe configured to feed fluid into a fluid reactor vessel,
a sparger apparatus in fluid connection with the fluid feeding pipe and configured to feed bubbles of first fluid mixture containing first carrier fluid and first active fluid into fluid flowing in the fluid feeding pipe, wherein the fluid feeding pipe comprises a first reaction pipe section downstream of the sparger apparatus and upstream of the fluid reactor vessel and wherein first fluid mixture and fluid is configured to react in at least one of the first reaction pipe section of the fluid feeding pipe and the fluid reactor vessel,
a first fluid source for first fluid mixture that is in fluid connection with the sparger apparatus by means of a first fluid mixture feeding pipe configured to feed first fluid mixture from the first fluid source for first fluid mixture to the sparger apparatus,
a first fluid mixture return pipe that is in fluid connection with the fluid reactor vessel and with the first fluid source for first fluid mixture and that is configured to feed first fluid mixture from the fluid reactor vessel to the first fluid source for first fluid mixture,
a first fluid analyzer in contact with the first fluid mixture and configured to measure the relative content of first active fluid in the first fluid mixture,
a first active fluid source in fluid connection with the first fluid source for first fluid mixture,
wherein the first fluid analyzer and the first active fluid source being functionally connected,
by the first fluid analyzer being configured to control the first active fluid source in response to the measured relative content of first active fluid in the first fluid mixture, and
a fluid discharge pipe that is in fluid connection with the fluid reactor vessel and that is configured to discharge treated fluid from the fluid reactor vessel,
and by the system being in fluid connection with a mineral beneficiation flotation arrangement comprising flotation vessels arranged in series,
wherein a first of said least two systems for treating fluid is in fluid connection with the grinder of the mineral beneficiation flotation arrangement and configured to feed treated fluid to the grinder of the mineral beneficiation flotation arrangement, and
wherein a second of said least two systems for treating fluid is in fluid connection with the mineral beneficiation flotation arrangement at a point downstream of the grinder of the mineral beneficiation flotation arrangement and upstream of the first flotation vessel of said flotation vessels arranged in series of the mineral beneficiation flotation arrangement and configured to feed treated fluid to said point downstream of the grinder of the mineral beneficiation flotation arrangement and upstream of the first flotation vessel of said flotation vessels arranged in series of the mineral beneficiation flotation arrangement.

44. The flotation arrangement according to claim 43, wherein said at least two systems are configured to receive fluid from the last flotation vessel of said flotation vessels arranged in series of the mineral beneficiation flotation arrangement.

45. The flotation arrangement according to claim 43, wherein said at least two systems are configured to receive fluid from the last flotation vessel of said flotation vessels arranged in series of the mineral beneficiation flotation arrangement via a gravity-based separator.

46. The flotation arrangement according to claim 43, wherein said at least two systems are configured to receive fluid from the last flotation vessel of said flotation vessels arranged in series of the mineral beneficiation flotation arrangement via a gravity-based separator and a particle separator that is arranged downstream of the gravity-based separator.

* * * * *